United States Patent
Anderson

(10) Patent No.: US 9,545,894 B2
(45) Date of Patent: Jan. 17, 2017

(54) SINGLE STAGE DUAL CHAMBERED PASSENGER AIRBAG

(71) Applicant: TK Holdings Inc., Auburn Hills, MI (US)

(72) Inventor: Christopher L. Anderson, Harrison Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/450,187

(22) Filed: Aug. 1, 2014

(65) Prior Publication Data

US 2015/0035264 A1    Feb. 5, 2015

Related U.S. Application Data

(60) Provisional application No. 61/861,045, filed on Aug. 1, 2013.

(51) Int. Cl.
| | |
|---|---|
| *B60R 21/233* | (2006.01) |
| *B60R 21/26* | (2011.01) |
| *B60R 21/2338* | (2011.01) |

(52) U.S. Cl.
CPC ........... *B60R 21/233* (2013.01); *B60R 21/26* (2013.01); *B60R 2021/23382* (2013.01); *B60R 2021/26094* (2013.01)

(58) Field of Classification Search
CPC .......... B60R 21/233; B60R 21/26; B60R 2021/26094; B60R 2021/2338; B60R 2021/23382

USPC ........... 280/729, 736, 743.1, 743.2
See application file for complete search history.

(56) References Cited

U.S. PATENT DOCUMENTS

| | | | | |
|---|---|---|---|---|
| 5,398,958 | A * | 3/1995 | Taggart | 280/728.2 |
| 5,697,641 | A * | 12/1997 | McGee et al. | 280/743.1 |
| 7,445,237 | B2 * | 11/2008 | Boyle et al. | 280/739 |
| 7,543,850 | B2 | 6/2009 | Bachraty et al. | |
| 7,597,355 | B2 * | 10/2009 | Williams et al. | 280/739 |
| 7,607,689 | B2 * | 10/2009 | Kalczynski et al. | 280/739 |
| 7,658,407 | B2 * | 2/2010 | Ford | B60R 21/2338 |
| | | | | 280/739 |
| 8,070,183 | B2 * | 12/2011 | Kumagai et al. | 280/743.2 |
| 8,152,199 | B2 * | 4/2012 | Bauer | B60R 21/233 |
| | | | | 280/739 |
| 2007/0267855 | A1 | 11/2007 | Lewis et al. | |

(Continued)

FOREIGN PATENT DOCUMENTS

| | | | | |
|---|---|---|---|---|
| FR | WO 2013095283 A1 * | 6/2013 | | B60R 21/233 |
| JP | 10-100827 | 4/1998 | | |

(Continued)

*Primary Examiner* — Darlene P Condra
(74) *Attorney, Agent, or Firm* — L.C. Begin & Associates, PLLC

(57) ABSTRACT

An airbag includes at least one panel defining an interior of the airbag, and a divider positioned in the interior so as to divide the interior into a first chamber and a second chamber. A first valve assembly is operatively coupled to the divider for controlling the gas flow between the first chamber and the second chamber. A second valve assembly is fixed within the first chamber and fluidly communicates with an exterior of the airbag. The second valve assembly is operably dependent on the first valve assembly, thereby dynamically controlling the inflation profile of the airbag.

23 Claims, 19 Drawing Sheets

(56) References Cited

U.S. PATENT DOCUMENTS

| | | | |
|---|---|---|---|
| 2008/0290638 A1* | 11/2008 | Sahm et al. | 280/743.1 |
| 2009/0152846 A1* | 6/2009 | Choi | 280/729 |
| 2010/0001495 A1* | 1/2010 | Sekino et al. | 280/729 |
| 2010/0225095 A1* | 9/2010 | Smith et al. | 280/729 |
| 2012/0025497 A1* | 2/2012 | Yoo | B60R 21/239 280/729 |
| 2012/0153603 A1* | 6/2012 | Mallinger et al. | 280/739 |
| 2012/0306187 A1* | 12/2012 | Mendez et al. | 280/743.2 |
| 2013/0015641 A1 | 1/2013 | Mendez | |
| 2014/0151985 A1* | 6/2014 | Hotta et al. | 280/730.2 |
| 2014/0265275 A1* | 9/2014 | Rickenbach | B60R 21/232 280/739 |
| 2015/0298644 A1* | 10/2015 | Charpentier | B60R 21/233 280/729 |

FOREIGN PATENT DOCUMENTS

| | | |
|---|---|---|
| KR | 20040073017 | 8/2004 |
| WO | 2010108590 | 9/2010 |

\* cited by examiner

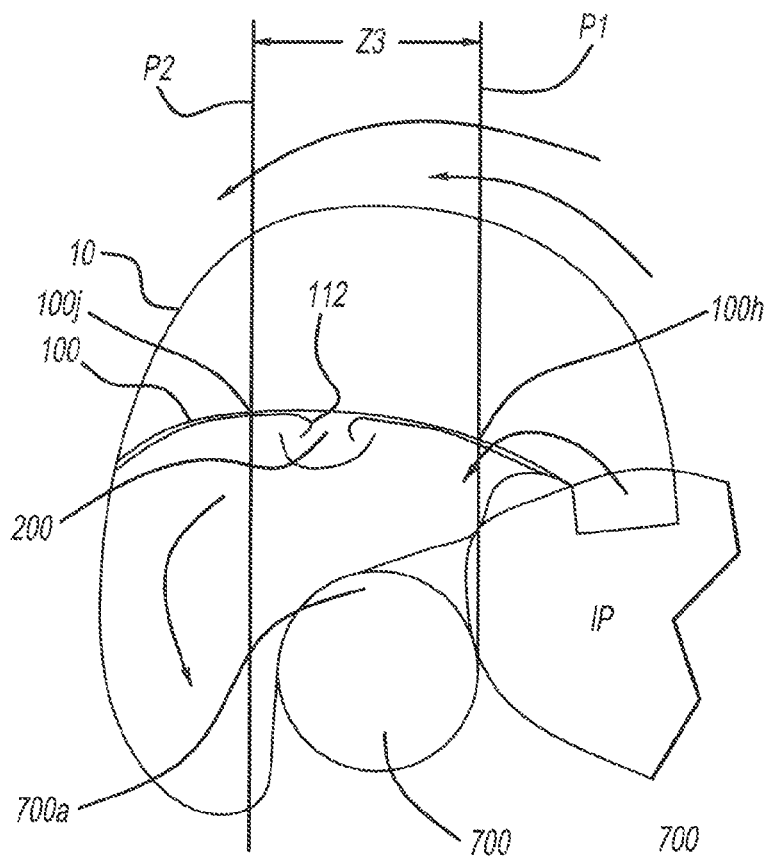
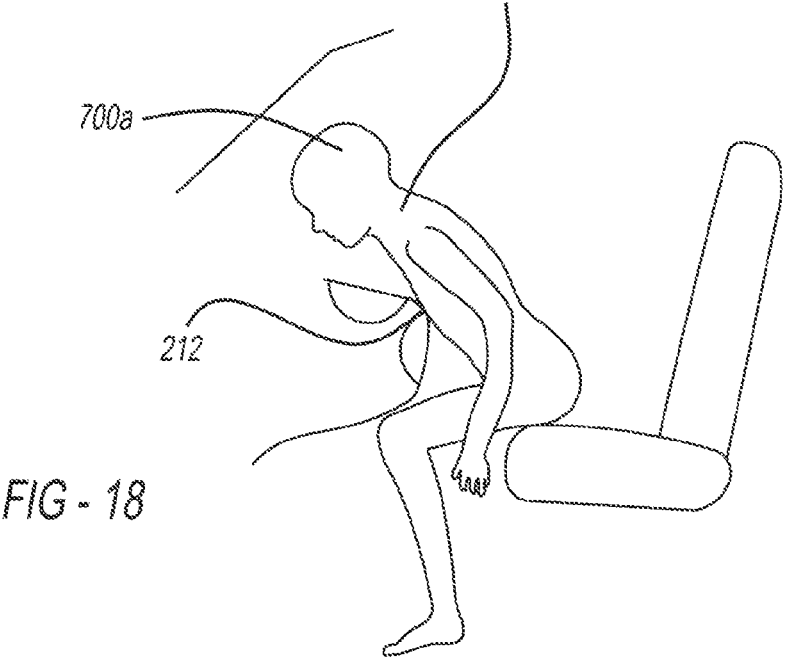

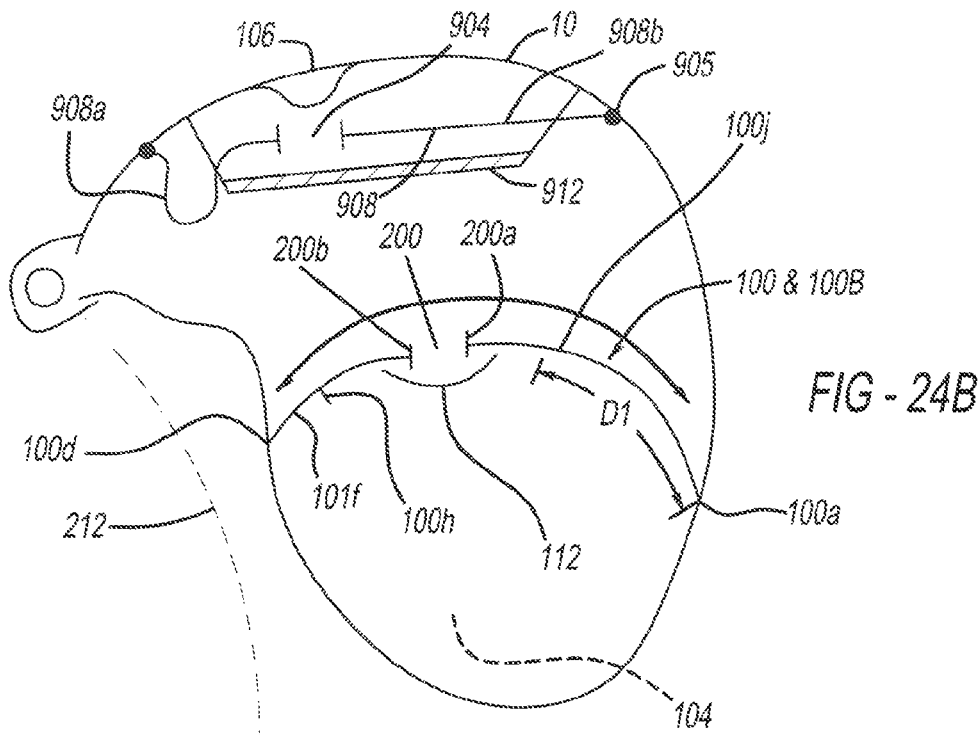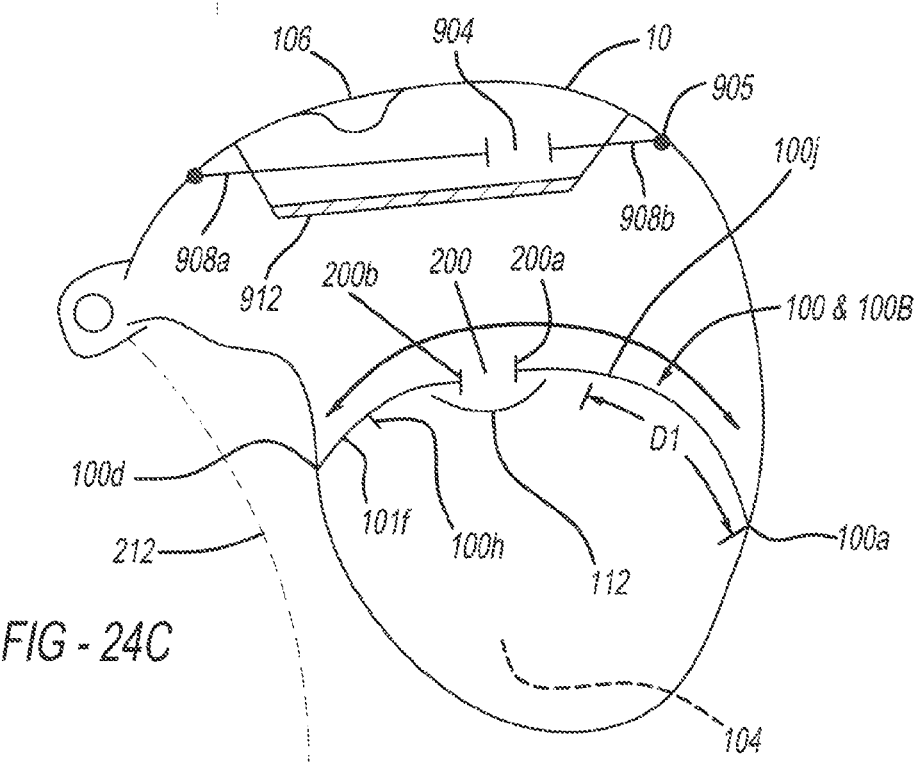

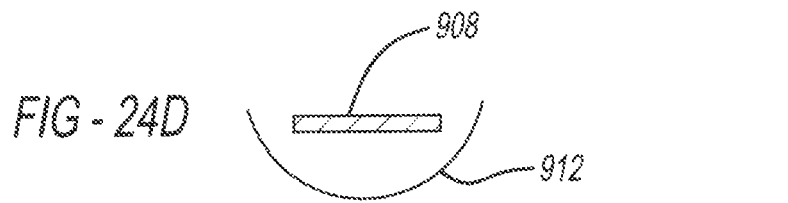
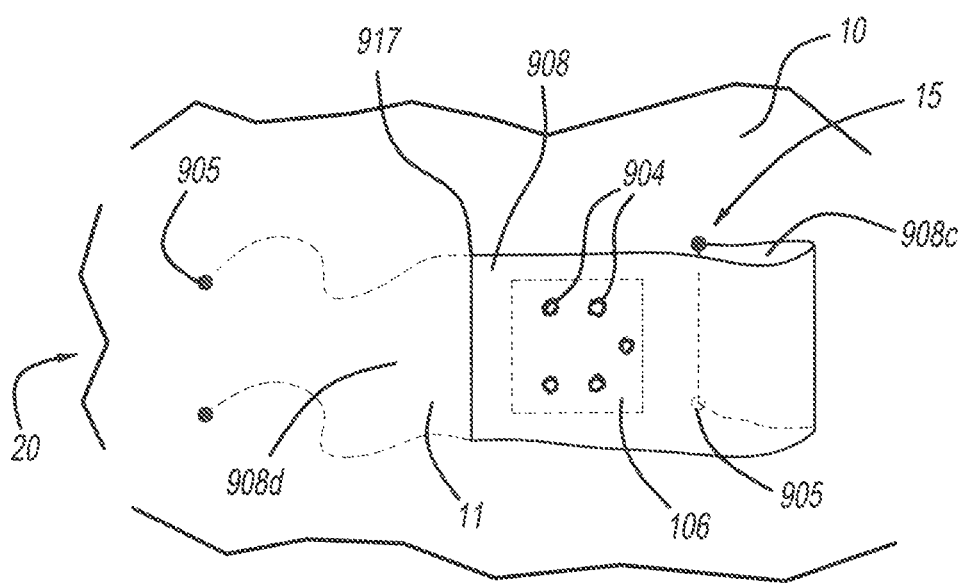
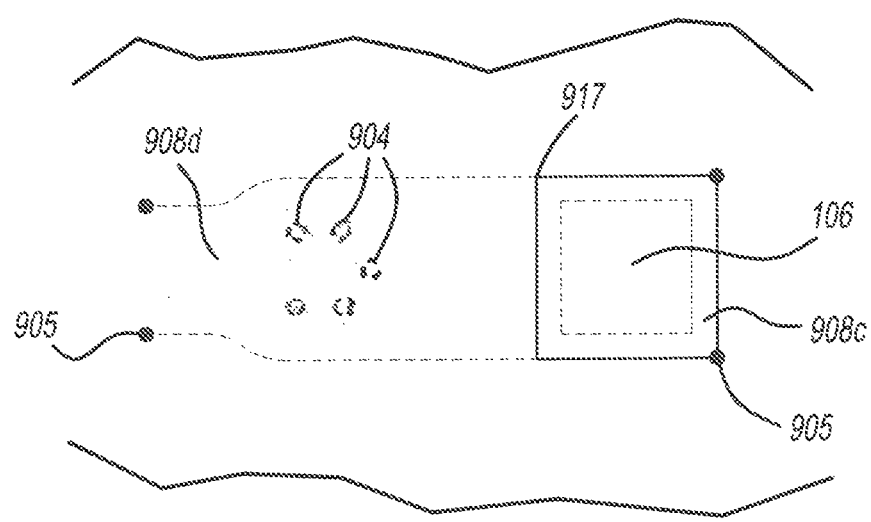

SINGLE STAGE DUAL CHAMBERED PASSENGER AIRBAG

CROSS-REFERENCE TO RELATED APPLICATIONS

This application claims the benefit of U.S. Provisional Application Ser. No. 61/861,045, filed on Aug. 1, 2013, the disclosure of which is incorporated herein by reference in its entirety.

BACKGROUND OF THE INVENTION

The present invention relates a passenger airbag, which is filled with gas during an emergency situation such as, for example, a frontal or side impact.

Current airbag cushion designs may include multiple chambers and may incorporate an inter-chamber venting system that allows gas to flow from one chamber to another. These cushions are configured to rapidly contact a vehicle occupant when inflated, to limit movement of the passenger head, neck and thoracic regions. However, these cushion designs do not differentiate between these different regions with regard to the stiffness or resistance of the various portions of the airbag to contact with each region.

Research has shown that the masses of the various body portions contacting an airbag differ greatly. For example, the mass ratio of the Thorax to Head & Neck regions may range from between 5:1 to 8:1, depending on the sex of the individual. Due to the differences in body part masses and the dynamics of contact between the occupant and the cushion, it has proven difficult to design a multi-chamber airbag which provides optimum protection for each portion of the body contacting the airbag.

An additional challenge involves the use of a dual stage inflator. A dual stage inflator is typically employed to provide sequential production of gas depending on crash severity and depending on occupant size and/or position for example. A dual stage inflator may be defined as containing two combustion chambers, a primary and a secondary chamber, with each chamber when operated providing a first and second stage of combustion. In general, the primary chamber is configured to ignite and produce gases in the event of a crash event. The secondary chamber is provided to affect a greater restraint due to greater gas production should the occupant be recognized as being of greater weight and size, and/or, should the impending crash severity be calculated as requiring a greater or faster restraint. Although effective in these regards, a dual stage inflator is relatively more expensive than a single stage inflator or one that only includes a single combustion chamber with one stage of combustion. It would therefore be an improvement in the art to provide a solution that mitigates the need for a dual stage inflator but still affords the protection provided by a dual stage inflator.

Thus, a need exists for an airbag design which permits the stiffness or resistance to occupant impact provided by each portion of the airbag to be adjusted according to the time elapsed from the initiation of airbag deployment, the size of the occupant, and/or the masses of different portions of the occupant's body contacting an associated portion of the airbag.

SUMMARY OF THE INVENTION

In one aspect of the embodiments described herein, an airbag is provided including at least one panel defining an interior of the airbag, and a divider positioned in the interior so as to divide the interior into an upper chamber and a lower chamber. A first valve mechanism or valve assembly is operatively coupled to the divider for restricting a flow of gases from the lower chamber into the upper chamber. The valve mechanism is structured such that an actuation response time of the valve in attenuating or impeding gas flow from the lower chamber into the upper chamber is proportional to the pressure differential between the upper and lower chambers.

In another aspect of certain embodiments described herein, those that at least have a first valve assembly within the divider, an airbag is provided including at least one panel defining a front side of the airbag structured to define a flat plane (P) when the airbag is in an inflated condition.

In another aspect of the embodiments of the described herein, an airbag is provided including at least one panel defining an interior of the airbag and a divider positioned in the interior so as to divide the interior into an upper chamber and a lower chamber. The airbag is structured so as to deploy above a top of a head 700a of a Hybrid III 6-Year Old Anthropomorphic Test Device, as the upper chamber inflates in the initial stage of deployment and when the head is positioned resting against or proximate the vehicle instrument panel at a location specified as Position-2 for NHTSA Out of Position (OOP) testing in accordance with FMVSS Standard No. 208.

In another aspect of certain embodiments described herein, an airbag is provided including at least one panel defining an interior of the airbag and a divider positioned in the interior so as to divide the interior into an upper chamber and a lower chamber. With reference to FIG. 16, the divider has at least one opening formed therealong, the at least one opening being positioned such that all edges of the at least one opening reside within a zone (Z3) bounded by a first vertical plane (P1) residing a predetermined distance (100f) along the divider from an inflator side (100d) of the airbag toward an occupant contact side of the airbag, and a second vertical plane (P2) passing through a location (100j) defined by a distance (D1) along the divider from a seam (110a) connecting the divider (100) with the occupant side of the airbag, after activation of the airbag.

With regard to D1 as shown in the Figures, it has been found that when an AF05 ATD contacts the frontal region 20 of the cushion 10, the head first contacts the softer upper region defined by the upper chamber 102, thereby slowing the momentum of the head. The curvature in the divider 100, defined by the dimension D1, broadens the upper chamber 102. This has been found to ensure that the head collides with the softer upper region 102 rather than the relatively harder thoracic region 104. It is believed that the improved kinematics of the AFO5 ATD will result in an improved airbag that enhances the safety of the airbag.

In another aspect of certain embodiments described herein, an airbag is provided including at least one panel defining an interior of the airbag, and a divider positioned in the interior so as to divide the interior into an upper chamber and a lower chamber. The airbag is structured to provide proportional restraint of a thoracic region of a vehicle occupant after activation of the airbag.

In an additional aspect of the invention, an airbag as described above also includes an upper chamber second vent assembly that provides venting of the cushion's upper chamber depending on operational events. As stated above and in accordance with the present invention, so long as the pressure in the upper chamber is attenuated by contact of the upper chamber with the upper body or head of an occupant, the gas pressure is biased to flow through the middle divider first valve assembly into the lower chamber. As the occupant kinematics favor an occupant's torso contact with the lower chamber of the airbag, air pressure is thereby redirected through the dividing panel's first vent assembly into the upper chamber and the first valve assembly is occluded. As the upper chamber pressure increases, a second valve member is slidably engaged with one or more venting orifices in the airbag upper panel, whereby the venting orifices are also occluded by a second valve member, thereby preventing venting of the airbag gas through the upper chamber venting orifices.

In general, the present invention includes an airbag containing a divider that forms a first chamber and a second chamber, wherein the divider contains a first valve assembly controlling the flow of gas from the first chamber to the second chamber. The invention further includes a second valve assembly within the first chamber that is operatively dependent on the first valve assembly. The term "operatively dependent" is understood to mean that the second valve assembly will be open or will be closed based on a condition precedent of the first valve assembly. In the present context, for example, the first valve assembly may attenuate or occlude gas flow from the second chamber to the first chamber based on a pressure increase within the second chamber. When that occurs, the second valve assembly is prompted to close based on a resultant increase in pressure within the first chamber. The dual valve assemblies eliminate the need for a dual stage inflator, by providing a dynamic and substantially similar protection with gas produced from a single stage inflator.

BRIEF DESCRIPTION OF THE DRAWINGS

FIG. 17 is a side view of the airbag of FIG. 16 showing a later stage of inflation of the airbag.

FIG. 18 is a schematic view of an Anthropomorphic Test Device positioned in Position-2 for NHTSA Out of Position testing under FMVSS Standard No. 208.

FIG. 24B is view of the airbag of FIG. 24A containing a first valve assembly and a second valve assembly, prior to actuation of the airbag.

FIG. 24C is a view of the airbag of FIG. 24B, after actuation of the airbag.

FIG. 24D is a cross-section of the tether as it extends through the sleeve.

FIG. 25A is a view of a second embodiment of a second valve assembly providing a fluid communication between the exterior and interior of the airbag, prior to actuation of the airbag.

FIG. 25B is a view of the second valve assembly in FIG. 25A, after actuation of the airbag.

DETAILED DESCRIPTION

Figure 1:
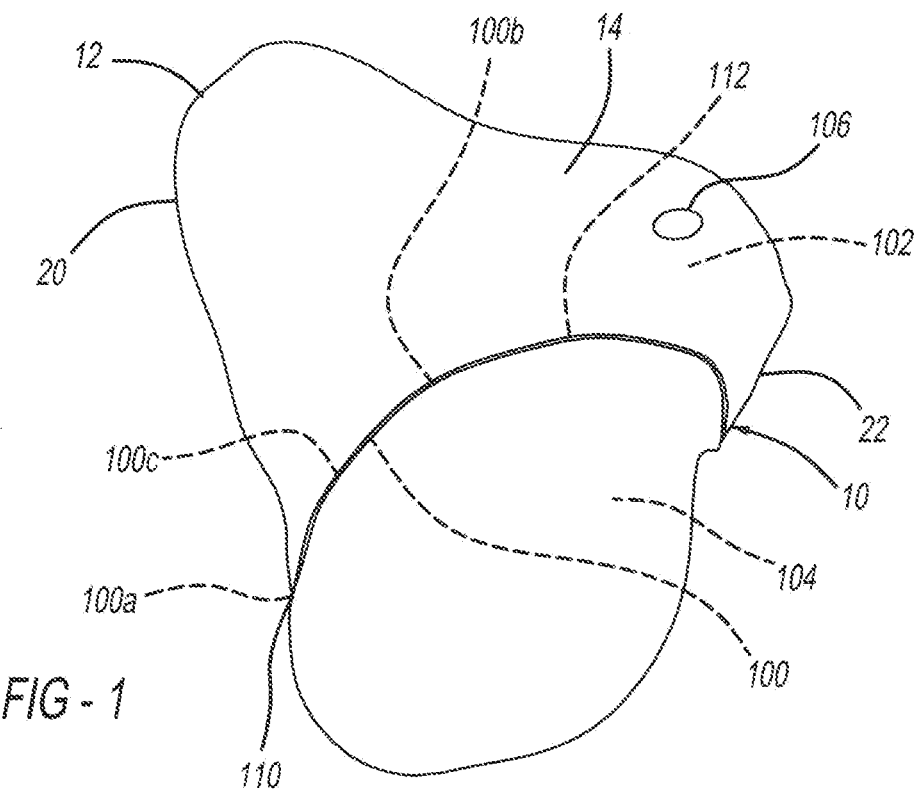
FIG. 1 is a side view of a passenger-side airbag (in an inflated state) in accordance with one embodiment of the present invention.
Figure 2:
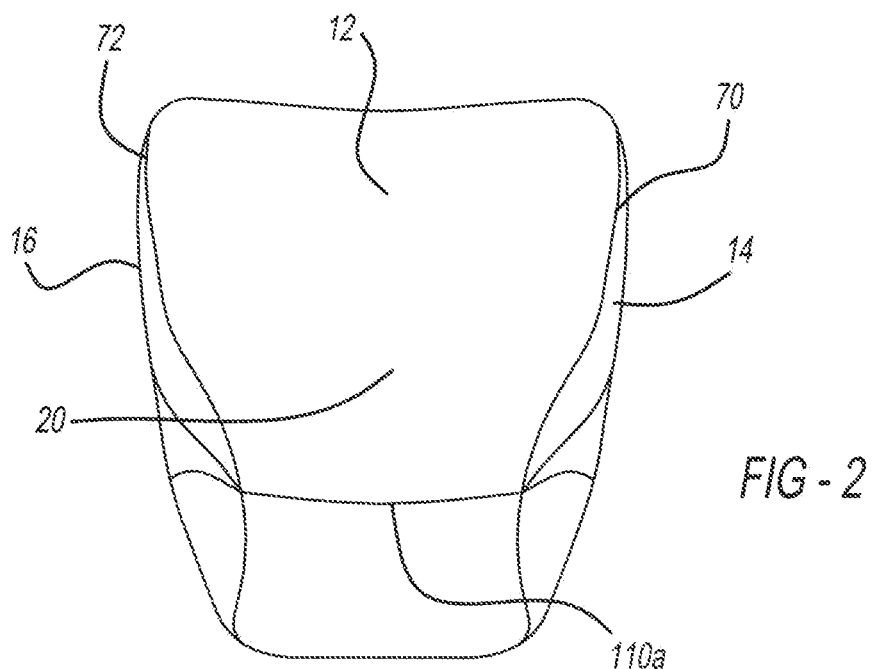
FIG. 2 is a front view of the airbag of FIG. 1.
Figure 3:
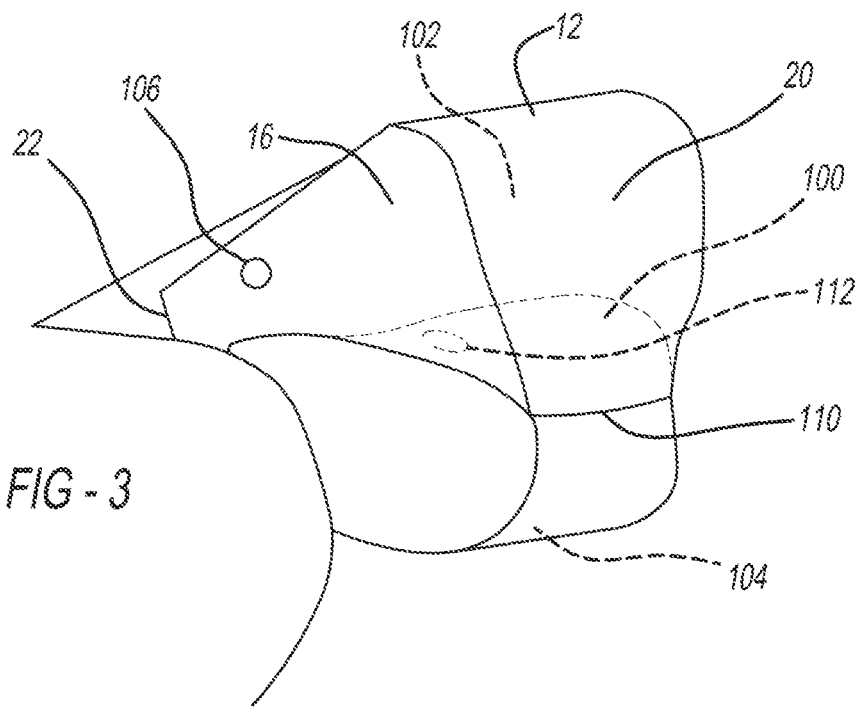
FIG. 3 is a schematic perspective view of the airbag of FIG. 1, showing elements of the airbag interior.

Embodiments of the present invention will be described below with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, 7,931,299, and 8,322,748, for example, describe many such aspects and are incorporated herein by reference in their entirety, but not by way of limitation.

FIGS. 1-4 are views of a passenger-side airbag 10 (in an inflated state) according to an embodiment of the present invention. The airbag embodiment shown in FIGS. 1-4 is formed from three panels. Specifically, the airbag is formed of a main panel 12, a right side (when viewing the airbag from a seated position) panel 14, and a left side panel 16 opposite the right side panel 14. Each of the side panels 14, 16 is generally planar (when the airbag 10 is not inflated). The main panel 12 connects the left and right panels and wraps around the airbag 10. As a result, the entirety of the right edge of the main panel 12 is connected along a seam 70 (e.g., by stitching, sewing, or other suitable means) to the right panel 14 and the entirety of the left edge of the main panel 12 is connected along a seam 72 (e.g., by stitching, sewing, or other suitable means) to the left panel 16.

The main panel 12 has both a front, impact side 20 and a rear, inflator side 22. After wrapping around the airbag 10, ends of the main panel 12 are joined at the rear inflator side. In addition, the rear inflator side 22 has slits (not shown) which are sized to receive an inflator (not shown), and may also include holes (not shown) which are sized to receive bolts (or other suitable fasteners) that are configured to secure the airbag 10 to the body of an automobile (or other device). The "front side" of the airbag or of main panel 12 is that portion of the airbag structured and positioned so as to be impacted first by a vehicle occupant when the airbag is activated.

Referring to FIGS. 1-4, a divider 100 is stitched or otherwise suitably attached along a perimeter thereof to interior surfaces of the main, left and right panels. It has been found that this configuration may assist in pulling the sides in, or in maintaining the orientation of the sides, to better maintain the desired shape of the airbag. The divider 100 is attached to the panel interior surfaces along a seam 110 so as to restrict gas flow between the divider and the panels to which it is attached. In a particular embodiment, the divider 100 is attached to the panel interior surfaces along seam 110 so as to form a gas-tight seal between the divider and the panels to which it is attached. Divider 100 divides the airbag interior into an upper chamber 102 and a lower chamber 104.

Figure 7:
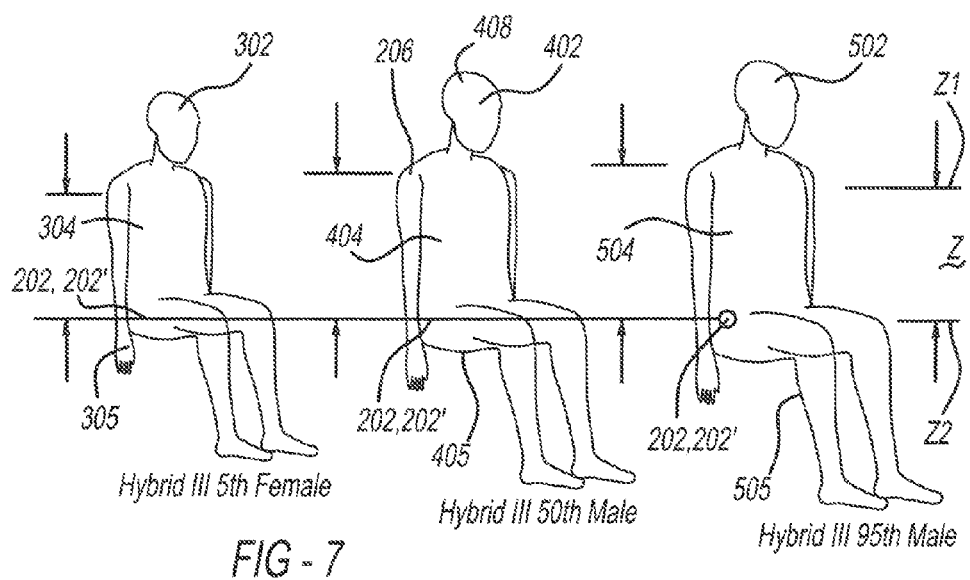
FIG. 7 is a schematic view showing relative proportions of Anthropomorphic Test Devices and relevant parameters used to define the desired positioning of the divider within the airbag, in accordance with embodiments of the present invention.

In the embodiments of the present invention, the inflated shapes of the airbag 10 and divider 100 and the positions of the intersections between divider 100 and the interior portions of the panels 12, 14, 16 to which the divider is attached are configured so as to ensure that the head and neck regions (collectively designated 302 for a Hybrid III 5th percentile female test ATD 305, 402 for Hybrid III 50th percentile male test ATD 405, and 502 for a Hybrid III 95th percentile male test ATD 505, as shown in FIG. 7) of passengers of various sizes impact the bag along the exterior of the upper chamber 102 of the bag (i.e., that the upper chamber 102 absorbs the impact of the head and neck regions of the passenger). The configuration of the divider 100, its positioning within the airbag, and the position of the portion 110*a* of the seam 110 attaching the divider leading edge 100*a* to the panel 12 enable the cushion to match the forward movement of the relatively heavier thoracic regions (generally designated 304 in ATD 305, 404 in ATD 405, and 504 in ATD 505) to the forward movement of the relatively smaller and lighter head & neck regions 302, 402, 502.

Referring to FIGS. 1-4, in one example, edge 100*a* of divider 100 attached to an interior surface of the front side 20 of main panel 12 defines a leading edge 100*a* of the divider 100. Leading edge 100*a* is attached to the main panel front side 20 along seam 110 and is configured such that the leading edge 100*a* and the portion 110*a* of the seam 110 attaching the leading edge to the front side will reside below the neck and head regions of any passenger contacting the airbag front side (more specifically, within the zone Z shown in FIG. 7 and defined below), when the airbag mounted in the vehicle and is fully inflated. In this configuration of the airbag, the passenger head and neck regions will always contact the airbag along an exterior of the bag upper chamber 102.

In the particular embodiment shown in FIGS. 1-4, divider 100 is attached to the inner surfaces of the airbag panels 12, 14, 16 so as to form a curved surface 100*b* having a downwardly angling portion 100*c* terminating in leading edge 100*a* connected to front side 20. However, the seams connecting the divider 100 to the main and side panels may have any locations and/or configurations necessary to facilitate attachment to the panel 12 at the desired location within zone Z as described herein. For example, FIG. 5 shows the airbag embodiment of FIGS. 1-4 in an inflated state and mounted in a vehicle.

Figure 6:
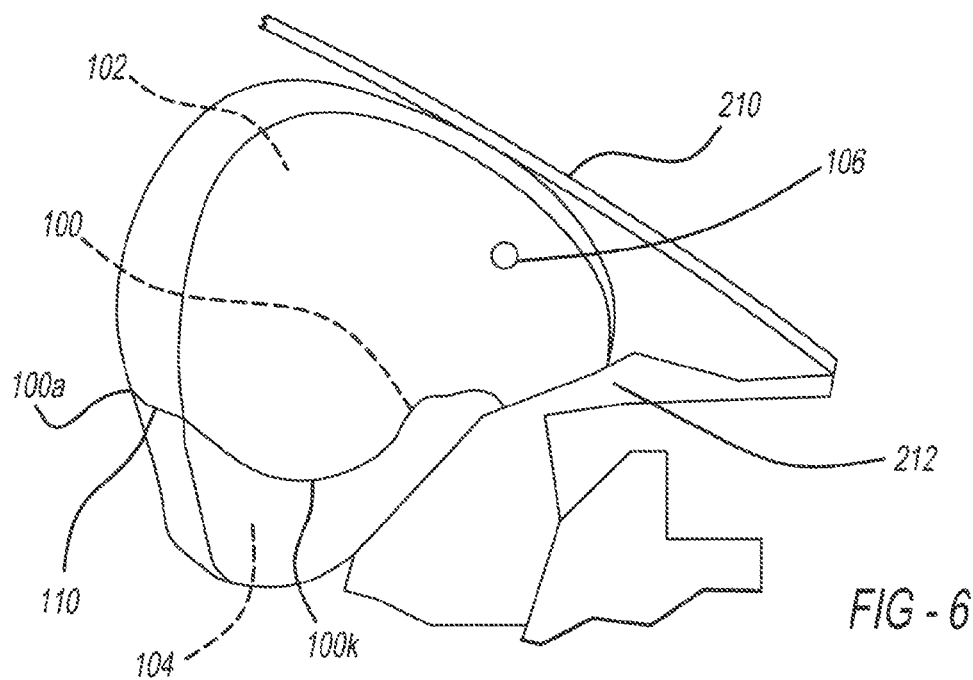
FIG. 6 is a perspective view of a passenger-side airbag in accordance with another embodiment of the invention, shown in an inflated state and mounted in a vehicle.

Referring to FIGS. 6 and 7, in the embodiments described herein, the divider leading edge 100*a* is attached to the main panel along a seam 110 positioned so as to reside within a zone Z defined at a lower end Z2 by the hip pivot 202 of a seated Hybrid III 5th female ATD 305, and at an upper end Z1 by the shoulder pivot 206 of a seated Hybrid III 50th ATD 405, inclusive. These boundary positions and other characteristics of all the test ATD's described herein are specified in 49 CFR Part 572, which is incorporated herein by reference in its entirety, and which may be found, for example, at "http://www.gpo.gov/fdsys/pkg/CFR-2011-title49-vol7/pdf/CFR-2011-title49-vol7-part572.pdf". In a particular embodiment, the hip pivot 202 of the seated Hybrid III 5th female ATD resides at a vertical distance of 3.30 inches above the portion of the seat in contact with the ATD, and the shoulder pivot 206 of the seated Hybrid III 50th male ATD resides at a distance of 17.5 inches above the portion of the seat in contact with the ATD. Thus, the dimension of the zone Z is 14.2 inches.

Figure 8:
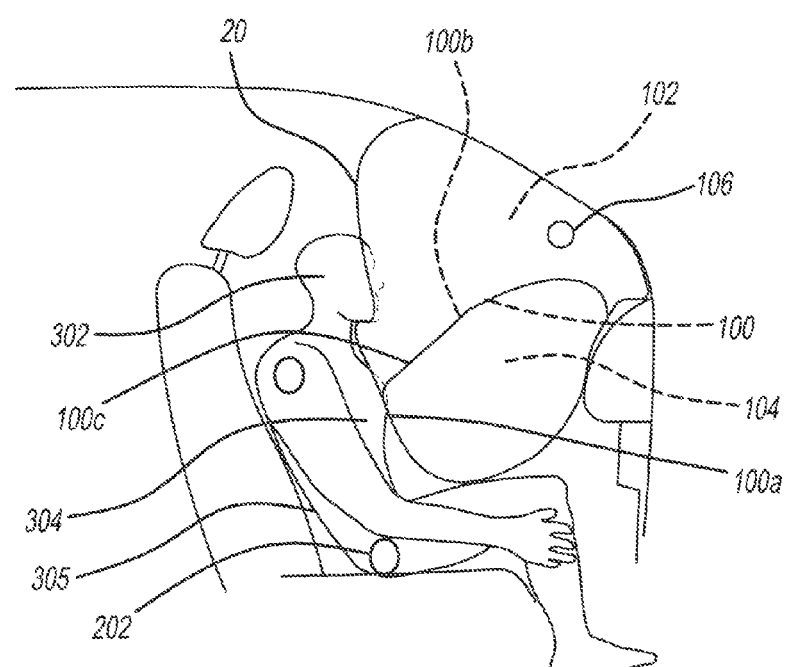
FIG. 8 is a side view of a Hybrid III 5th percentile female test Anthropomorphic Test Device contacting a deployed airbag in accordance with positioning of the divider within the airbag, in accordance with embodiments.
Figure 9:
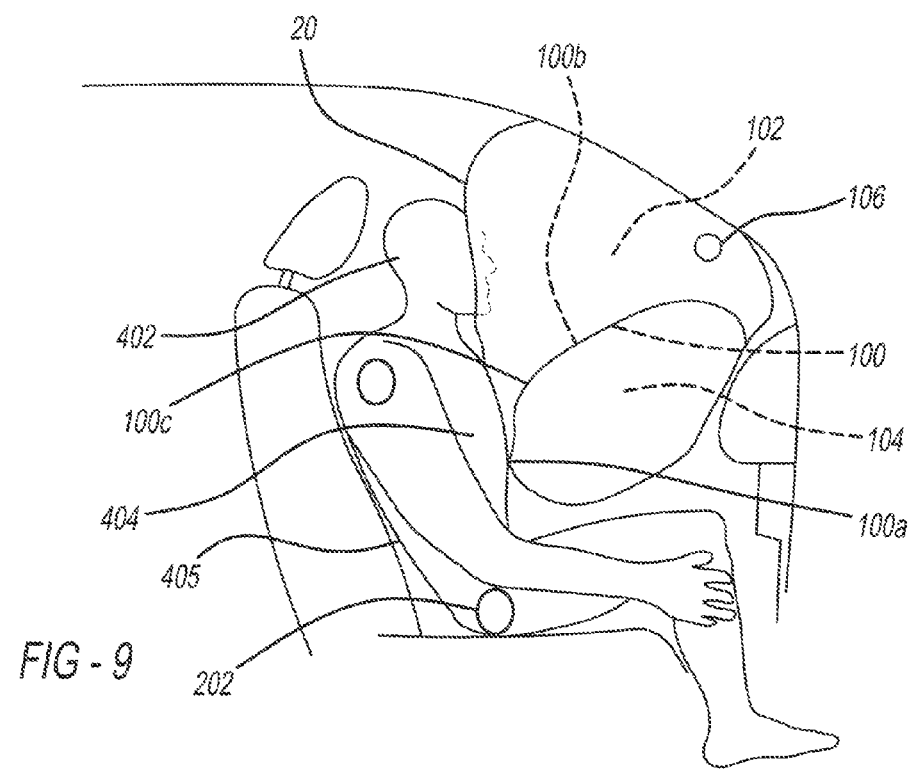
FIG. 9 is a side view of a Hybrid III 50th percentile male Anthropomorphic Test Device contacting a deployed airbag in accordance with positioning of the divider within the airbag, in accordance with embodiments.

It is noted that the hip pivots of the seated ATD's 305, 405, and 505 are collinear or at the same level, so that the hip pivot of the seated Hybrid III 50th male ATD 405 may be referred to as 202'. This common boundary of the zone Z may also serve as a reference axis. Also, in this embodiment, the portions of the body located above the respective shoulder pivots on ATD's 305, 405 and 505 are considered to define the respective head and neck regions of the ATD's. FIG. 8 shows contact between the front or contact face of a deployed airbag 10 and the divider leading edge seam 110*a* positioned as just described, and a Hybrid III 5th female ATD 305. FIG. 9 shows contact between a deployed airbag 10 of the same design shown in FIG. 8, and a Hybrid III 50th male ATD 405. It is seen that both of ATD's 305 and 405 contact the seam 110a connecting the divider leading edge 100a to the airbag main panel 12 within the zone Z previously described.

Figure 4:
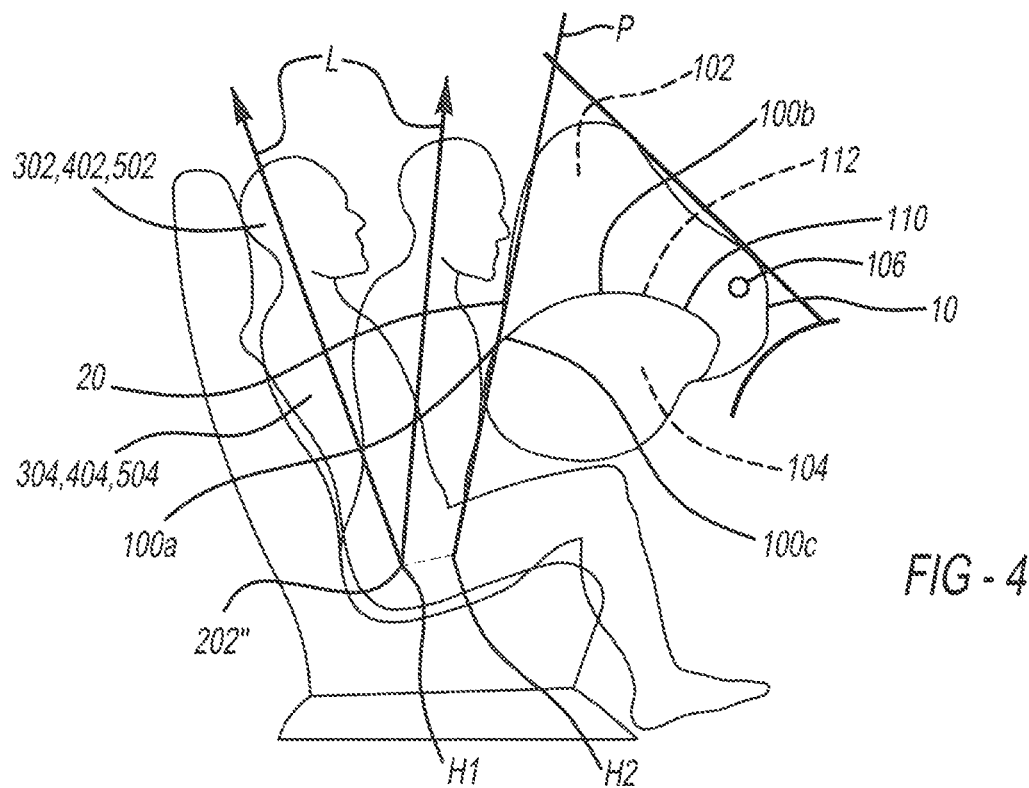
FIG. 4 is a side view of the airbag of FIG. 1 mounted and deployed in a vehicle in front of a seated passenger.
Figure 5:
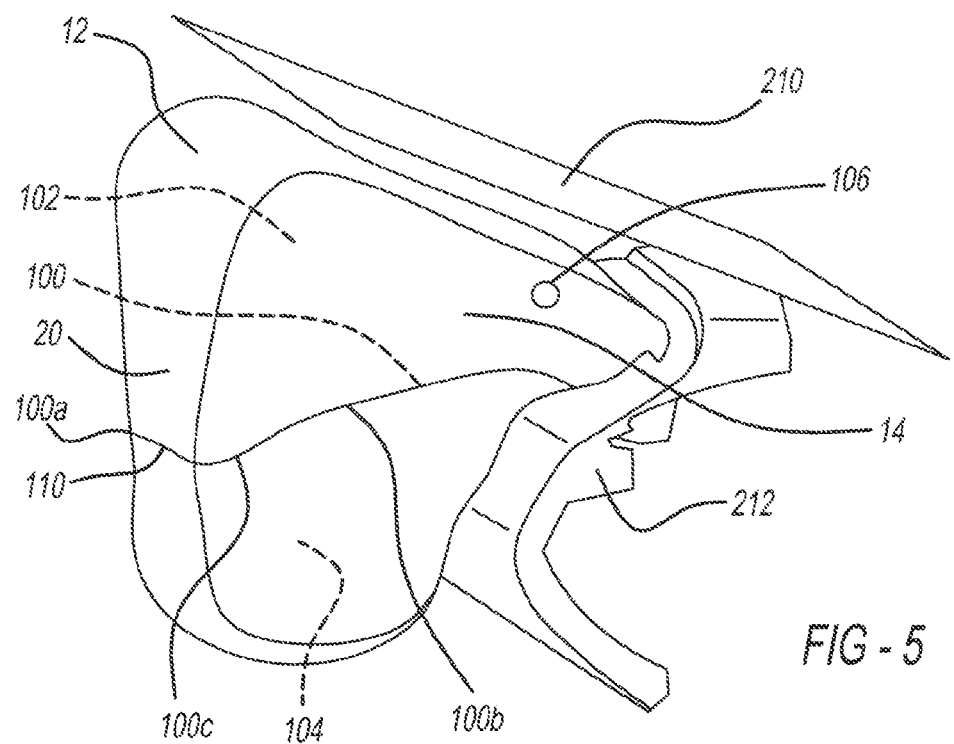
FIG. 5 is a perspective view of the passenger-side airbag of FIGS. 1-4, shown in an inflated state and mounted in a vehicle.

In the embodiments of the present invention described herein, the various airbag elements are shaped and connected to each other so that, when fully inflated, the front side 20 of the bag aids in maintaining alignment of the head, neck, and thoracic body regions along a line L as shown in FIG. 4 during impact with the airbag and after contact with the bag. It is desirable to maintain this alignment during and after contact with the bag, so that the entire upper body of the passenger (i.e., the head, neck, and thoracic regions) effectively pivots about the hip axis of the passenger, as shown in FIG. 4. To this end, as seen in FIG. 4, the bag is structured such that the portions of the inflated bag front side 20 contacted by the passenger form an essentially flat plane, indicated by the line P in the drawing. It is also desirable that the line L along which these body regions lie be parallel with the plane P during and after impact with the airbag, to aid in preventing differential motion of the head/neck region and the thorax region (i.e., a bending of the neck and head regions relative to the thorax).

An inter-chamber venting system is provided to permit gas to flow from the upper chamber 102 into the lower chamber 104, and also fir controlling or restricting backflow from the lower chamber 104 into the upper chamber 102. More generally, it will be appreciated that the multi-valve assembly presented in accordance with the invention essentially controls flow between a first chamber and a second chamber. In one embodiment the first chamber is the upper chamber 102 and the second chamber is the lower chamber 104. However, it will be appreciated that modifying the applied orientation of the airbag within the vehicle may of course change the characterization of the chambers from an upper chamber to a first side chamber for example, and, from a lower chamber to a second side chamber for example.

In one embodiment, a flow restriction valve 112 (shown schematically in the drawings) is incorporated into or otherwise operatively coupled to divider 100 for controlling flow between the upper and lower chambers. The valve is structured such that an actuation response time of the valve in attenuating or impeding gas flow from lower chamber 104 into upper chamber 102 is proportional to the pressure differential between the upper and lower chambers. The valve is also structured such that a backflow rate of gases through the valve and into the upper chamber is proportional to the pressure differential between the upper and lower chambers.

Valve 112 may have any of a number of structures suitable for controlling gas flow in the airbag interior, in the manner described herein. In one embodiment, the valve has the structure shown in U.S. Patent Application No. 61/862,491, the disclosure of which is incorporated herein by reference. In another embodiment, the valve has the structure shown in U.S. Patent Application No. 61/865,095, the disclosure of which is also incorporated herein by reference. The gas flow rate from the upper chamber 102 into the lower chamber 104 may be controlled in a known manner by controlling the valve structure and dimensions.

Portions of one or more of panels 12, 14, 16 defining upper chamber 102 incorporate one or more vents (not shown) therein to release gas from the upper chamber to the environment exterior of the airbag in a controlled manner during contact between a passenger and the airbag.

Operation of an airbag in accordance with an embodiment of the invention, and movement of the vehicle occupant's body prior to and during contact with a deployed airbag are illustrated in FIG. 4.

FIGS. 10-14 show a typical deployment/passenger contact sequence using an airbag in accordance with an embodiment of the present invention. FIGS. 8 and 9 show portions of collision tests using ATD's 305 and 405, respectively, meeting the specifications previously described, after deployment of the airbags and stoppage of passenger forward motion.

Figure 10:
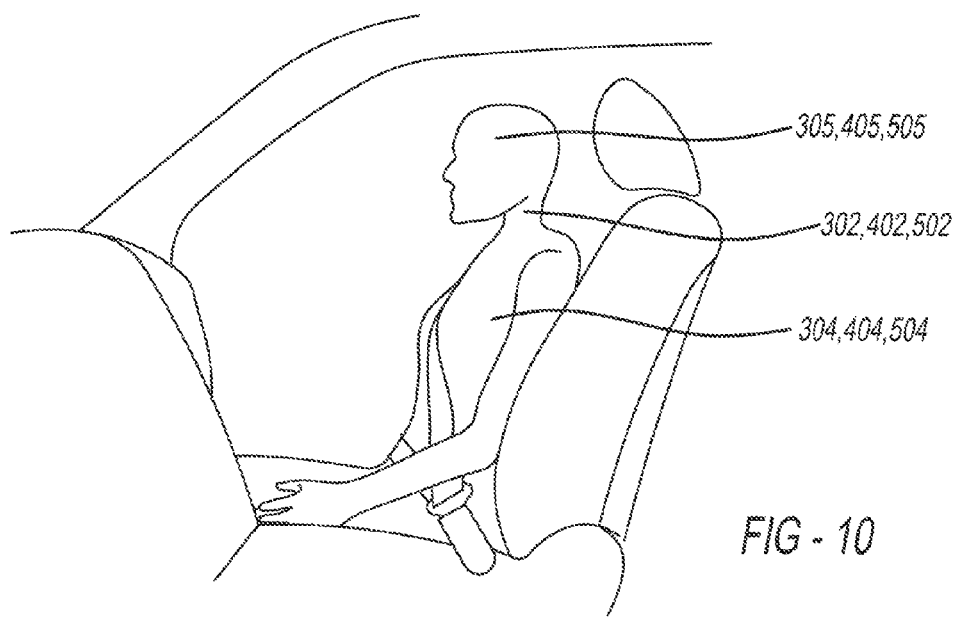
FIG. 10 is a side view of a vehicle passenger compartment showing a seated Anthropomorphic Test Device prior deployment of a vehicle airbag.

Referring to FIG. 10, prior to bag deployment, an ATD 305, 405, 505 is seated and airbag 10 (not shown) is operatively coupled to an associated gas generating system or other inflation fluid source (not shown), in a manner known in the art. The inflation fluid source may be operatively coupled to a collision event sensor (not shown) that includes (or is in operative communication with) a controller (not shown) which signals activation of the airbag system in the event of a collision. The airbag and its associated inflation means are configured to provide rapid inflation of the first or second chamber of the airbag depending on the occupant kinematics as described herein.

Figure 11:
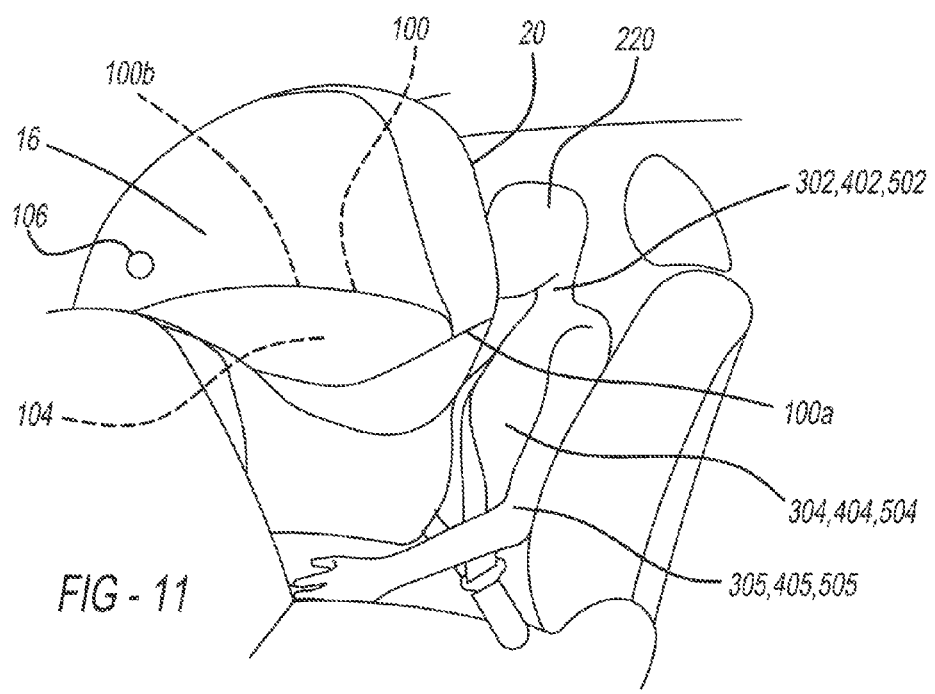
FIG. 11 is the side view of FIG. 10 just after the airbag has been activated and begins to deploy.
Figure 12:
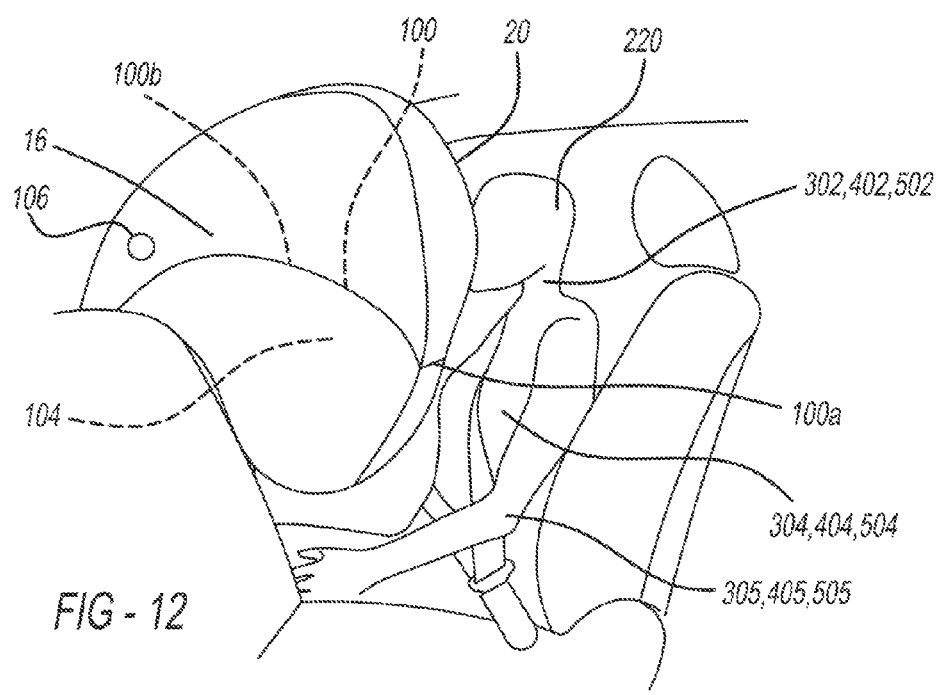
FIG. 12 is the side view of FIG. 11 after additional time has elapsed after airbag activation.
Figure 13:
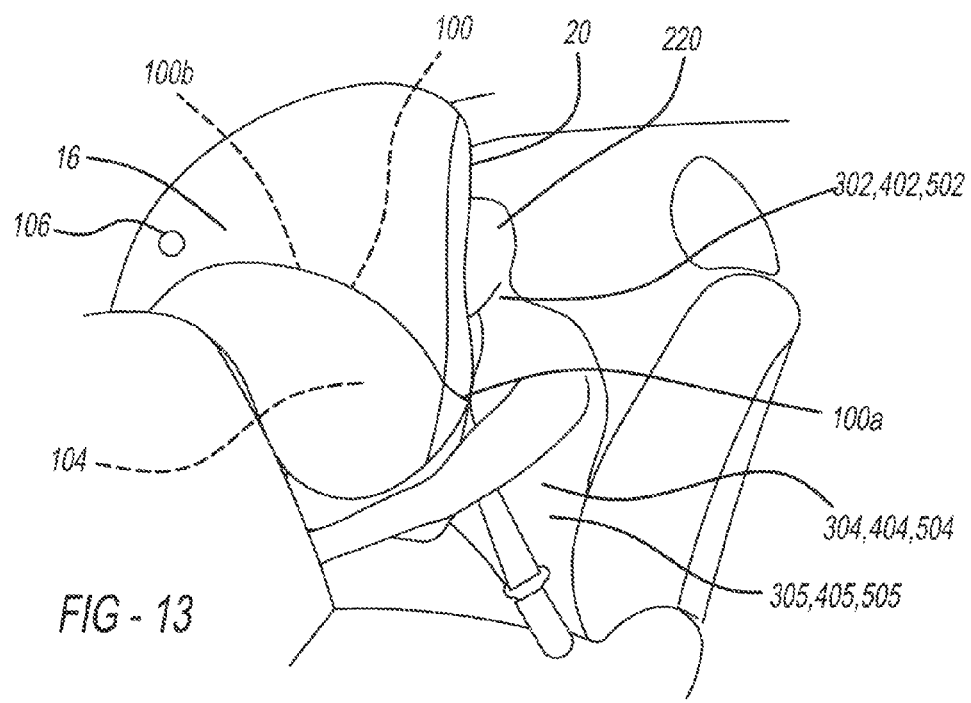
FIG. 13 is the view of FIG. 12 after full contact of the head and neck regions of the passenger with the airbag.
Figure 14:
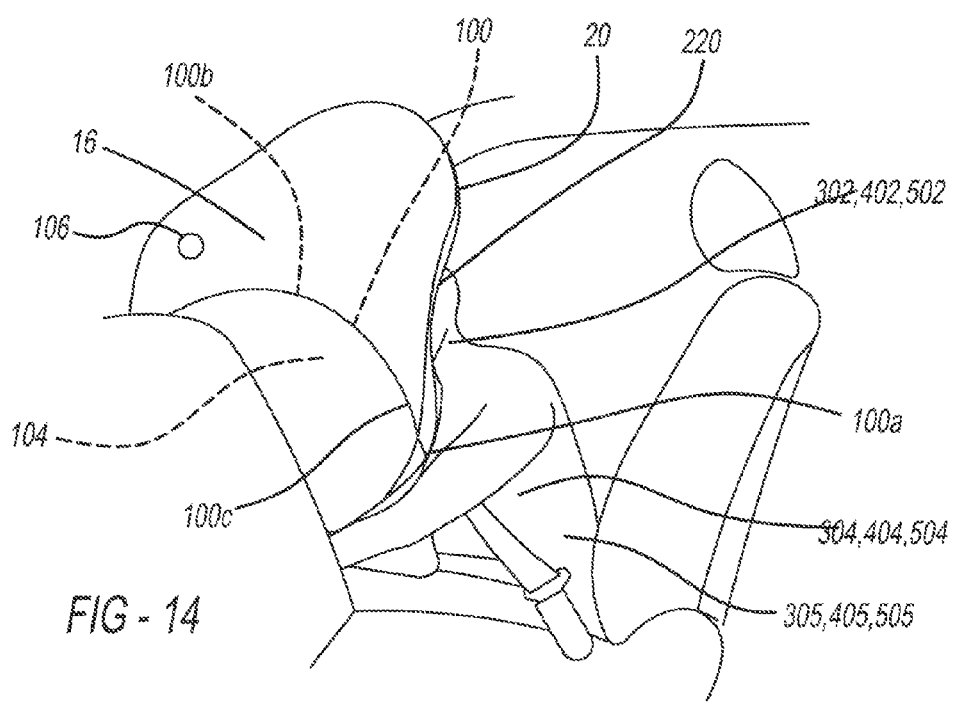
FIG. 14 is the view of FIG. 13 after contact of the thoracic region of the passenger with the seam of the leading edge of the airbag divider panel.

Referring now to FIGS. 11 and 12, when the system is activated, inflation gas flows from the inflation fluid source into upper chamber 102, rapidly inflating the upper chamber to enable this chamber to intercept the forward-moving head and neck regions as soon as possible, to aid in minimizing the momentum built up by the head and neck regions. At this early stage of airbag inflation, the occupant seatbelt may tension to maintain the occupant's lower thoracic region in the seat. Inflation gas then flows from the upper chamber 102 through valve 112 into lower chamber 104 to pressurize the lower chamber for supporting the occupant thoracic region when the seatbelt tensioner releases. Referring to FIGS. 13 and 14, when the lower chamber is filled, valve 112 actuates responsive to pressure in lower chamber 104 to attenuate or restrict the flow of gas back into the upper chamber 102. Also, as seen in FIGS. 8, 9, 13 and 14, contact between the ATD's and the airbag leading edge 100a occurs within respective zones Z defined by the hip and shoulder joint locations on the bodies of the ATD's as previously described. Referring to FIGS. 4, 8, 9, 13 and 14, it is seen that the divider leading edge seam 110 contacts the passenger between the hip pivot 202" of the passenger and the shoulder pivot 206" of the passenger.

Referring to FIGS. 13 and 14, if the thorax region of a relatively larger, heavier occupant impacts the portion of the airbag exterior enclosing the lower chamber, the pressure in the lower chamber rises relatively rapidly, causing the valve 112 to actuate relatively quickly to restrict gas flow back into the upper chamber, thereby maintaining a relatively higher pressure in the lower chamber. This higher pressure stiffens the airbag and helps to cushion and absorb the relatively greater mass and resultant momentum of the heavier occupant. However, if the thorax region of a relatively smaller or lighter occupant impacts the portion of the airbag exterior enclosing the lower chamber, the pressure in the lower chamber rises relatively more slowly, causing the valve 112 to actuate more slowly to restrict gas flow back into the upper chamber. This enables the lower chamber pressure to fall to a relatively lower level, causing the lower portion of the bag to be less stiff in cushioning and absorbing the relatively smaller mass and resultant momentum of the lighter occupant. As gases are forced from the lower chamber into the upper chamber through the valve 112, the lower chamber of the airbag continues to deflate and deflect so as to absorb energy.

In the same manner, as the passenger head and neck regions 302, 402, 502 contact the airbag, gases received in the upper chamber from the inflator and gases received through the valve via backflow from the lower chamber are vented to the bag exterior through the upper chamber vents 106 (shown schematically in FIG. 1), resulting in a reduction of upper chamber pressure and a "softening" of the bag front surface over the upper chamber, responsive to contact with the passenger's head and neck regions. This softening aids in providing support sufficient to protect the occupant's head and neck region, while helping to minimize the contact forces between the head/neck region and the airbag. The resistance provided by the bag to forward motion of the head and neck regions by the upper chamber is relatively less than the resistance provided to the thorax region by the lower chamber, due to the relatively lesser mass and inertia of the head and neck region. In this manner, proportional restraint of the occupant's thorax is achieved (i.e., the degree of stiffness or support is proportional to the mass and inertia of the occupant).

However, if the thorax of the occupant is in greater contact with the airbag, then as stated above, the valve 112 effectively closes due to a relatively quicker pressure buildup in the lower chamber. In accordance with one aspect of multi- or dual-valve assembly airbags of the present invention (those airbags containing at least one valve assembly 112 in the divider 100, and at least one second valve assembly 900 in a first chamber), the first or upper chamber then fills with gas at a relatively quicker rate thereby extending the upper chamber to a fuller inflated state. When this occurs, and with reference to FIGS. 23A-25B (further described below), a second valve assembly 900, identified by reference numerals in the 900's, closes to prevent venting of the upper chamber gases to the exterior of the airbag. Stated another way, a second valve 902 sewn into the upper chamber wall contains one or more holes 904, whereby each of the one or more holes 904 may be aligned with corresponding hole or plurality of holes 106 in one of the airbag panels such as airbag panel 12. A tether 908 is integrally or otherwise connected to the second valve 902, and is preferably sewn or otherwise attached to, or proximate to, the front side 20 of the panel 12. An extending portion 910 of the tether 908 extends between the valve 902 and the front side 20. As the airbag is activated and pressure begins to fill the upper chamber, the extending portion 910 of the tether 908 is extended to its full length whereby the holes 904 of the valve 902 correspondingly move to close the valve 902. As a result, upon extension of the tether 908, the material of valve 902 then occludes the holes 106 thereby preventing the release of gas to the exterior of the airbag through the valve 902. A guide member 912 may be sewn to the upper panel 12 and about the valve 902, within the airbag, to orient the position of the valve 902, and to ensure that the holes 904 and 106 remain aligned prior to activation of the airbag.

Accordingly, if the airbag pressure in the upper chamber begins to accumulate due to occlusion of the first valve 112, a substantially complete inflation of the upper chamber results in an occlusion of the second valve assembly 900, or in the closing of the second valve 902. It may therefore be stated that as fluid flow is mitigated or eliminated between the upper chamber and the lower chamber of the airbag, the second valve 902 operates to close offor attenuate fluid flow or fluid communication between the interior of the airbag and the exterior of the airbag, and between ports 904 and 106. In general, as the first valve 112 attenuates or eliminates flow between the upper chamber and the lower chamber, the second valve assembly 902 eliminates flow through holes 106 by the flush interface of non-permeable airbag material 914 of valve 902 against holes 106. Stated another way, as holes 904 are moved based on extension of the tether 908, the resultant increasing pressure in the upper chamber biases the non-permeable material 914 against the gas exit orifices 106 thereby preventing the escape or venting of gases to the exterior of the airbag.

In addition, because of valve 112, the lower chamber pressure is maintained at an optimum level, thereby maintaining the firmness of the bag surfaces exterior of the lower chamber in response to contact with the passenger. This facilitates pivoting of the passenger's upper body about the hip axis and maintenance of alignment of the thoracic and head and neck regions along axis L. Furthermore, the levels of restraint or resistance to forward motion (i.e. the stiffness) provided by each of the upper and lower chambers can be tuned or adjusted by appropriate modification of the valve and vent design parameters.

In the manner described above, the airbag is structured to include a region of relatively higher internal pressure for supporting a thoracic region of a vehicle occupant after airbag activation, and structured to include a region of relatively higher internal pressure for supporting a head and neck region of a vehicle occupant after the airbag activation.

It has been found that passenger-side airbags structured as described herein are more efficient with regard to usage of inflation gas than other airbag designs. This characteristic enables a relatively lower-output inflator or gas source to be used to inflate the airbag, rather than using a conventional dual-stage inflator, as the generated gas is conserved through all phases of the occupant protection event.

As described above, the airbag embodiments described herein provide restraint to the different body regions (head/neck and thorax) of the occupant according to the mass and inertia of each region. The stiffness of the airbag responsive to bodily contact may be adjusted by modifying the flow characteristics of the valve 112 connecting the upper and lower chambers. The stiffness of the lower chamber 104 may be reduced by modifying the valve 112 so as to permit a relatively greater flowrate of gas back into the upper chamber 102 responsive to pressure exerted on the lower chamber by the vehicle occupant. Conversely, the stiffness of the lower chamber 104 may be increased by modifying the valve 112 so as to permit only a relatively lower flowrate of gas back into the upper chamber 102 responsive to pressure exerted on the lower chamber by the vehicle occupant.

In another example, the stiffness of the upper chamber 102 may be reduced by modifying the upper chamber vents so as to permit a relatively greater flowrate from the upper chamber into the atmosphere responsive to pressure exerted on the upper chamber by the vehicle occupant. Conversely, the stiffness of the upper chamber 102 may be increased by modifying the upper chamber vents so as to permit only a relatively lower flowrate from the upper chamber into the atmosphere responsive to pressure exerted on the upper chamber by the vehicle occupant.

It has been found that passenger-side airbags structured as described above are especially effective in providing optimal cushion performance for both relatively larger and relatively smaller occupants. This bag structure enables the airbag surfaces to deflect responsive to contact with both the heavier thoracic region and the smaller and lighter head and neck region, so as to help maintain body alignment along line L (FIG. 4) during contact between the passenger and the airbag.

In another aspect of certain of the embodiments described herein, and particularly with regard to the embodiments having a valve assembly within the divider only, a volume ratio (VR) of the airbag may be defined as:

$$VR = V_{upper}/(V_{upper} + V_{lower}),$$

where $V_{upper}$ is the volume of the upper chamber 102 when fully inflated and $V_{lower}$ is the volume of the lower chamber 104 when fully inflated. As a result of the positioning of leading edge 100a so as to reside in zone Z as described herein, the embodiments of the present invention define a range of ratios of the upper chamber volume $V_{upper}$ when fully inflated to the total interior airbag volume ($V_{upper} + V_{lower}$) when fully inflated. In the embodiments described herein, the range of desired volume ratios is 35% to 85% inclusive. Stated another way, the range of volume ratios of the respective airbag may be governed by the following relation:

$$35\% \leq V_{upper}/(V_{upper} + V_{lower}) \leq 85\%$$

The governing equation for the volume ratio for dual-chambered airbags in accordance with single valve embodiments of the present invention is the ratio of the upper chamber alone over the total of both upper and lower chambers measured simultaneously, using the Ping Pong Ball Volume Method.

The particular volume ratio selected for a given airbag application is determined by such factors as the relative locations and dimensions of interior features of the vehicle in which the airbag is to be used. These characteristics determine the volume between the seated passenger, a windshield 210 and an instrument panel 212 (or other bag stowage location), for example, available for deployment of the airbag. For example, a relatively smaller available deployment space may require a relatively smaller airbag. In this case, the airbag volume ratio ($V_{upper}/(V_{upper} + V_{lower})$) may need to be tailored as described herein in order to optimize occupant protection.

The structure of the divider 100 and the locations at which the divider is attached to the main and side panels may be specified so as to provide a desired volume ratio within the specified range. For example, a relatively greater volume ratio may be achieved by locating and securing the divider at a relatively lower position within the airbag interior, so that the upper chamber volume is larger relative to the total interior volume of the bag. Conversely, a relatively lower volume ratio may be achieved by locating and securing the divider at a relatively higher position within the airbag interior, so that the upper chamber volume is smaller relative to the total interior volume of the bag.

FIG. 6 shows an embodiment of the divider position within the airbag interior, adjusted to provide a relatively greater volume ratio $VR = V_{upper}/(V_{upper} + V_{lower})$. In this variation, the divider 100 is configured and attached to the interior surfaces of the bag panels so as to form a depression 100k just behind the leading edge attachment 110a.

Figure 19A:
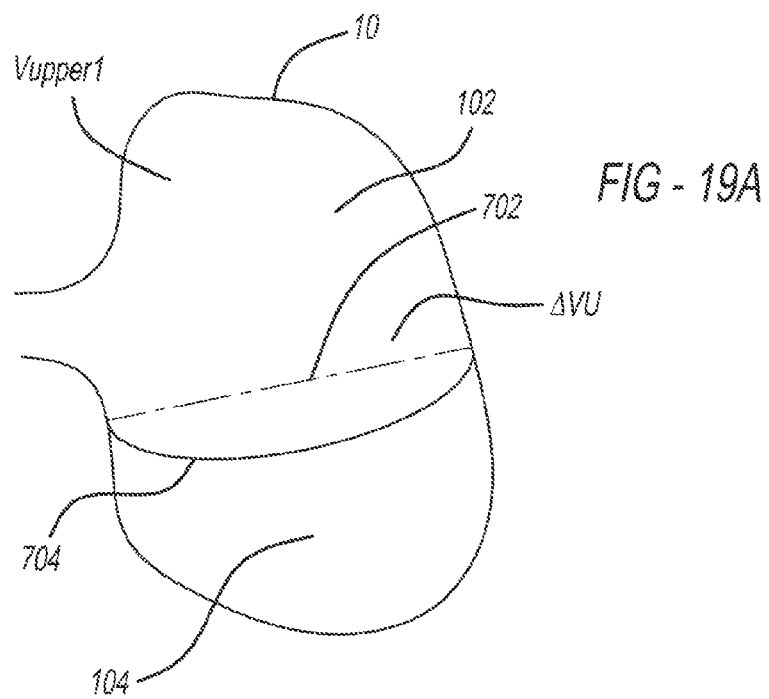
FIGS. 19A and 19B are schematic cross-sectional side views of an airbag in accordance with an embodiment described herein, showing a portion of the airbag interior volume shared by the upper and lower chambers when the bag is inflated.
Figure 19B:
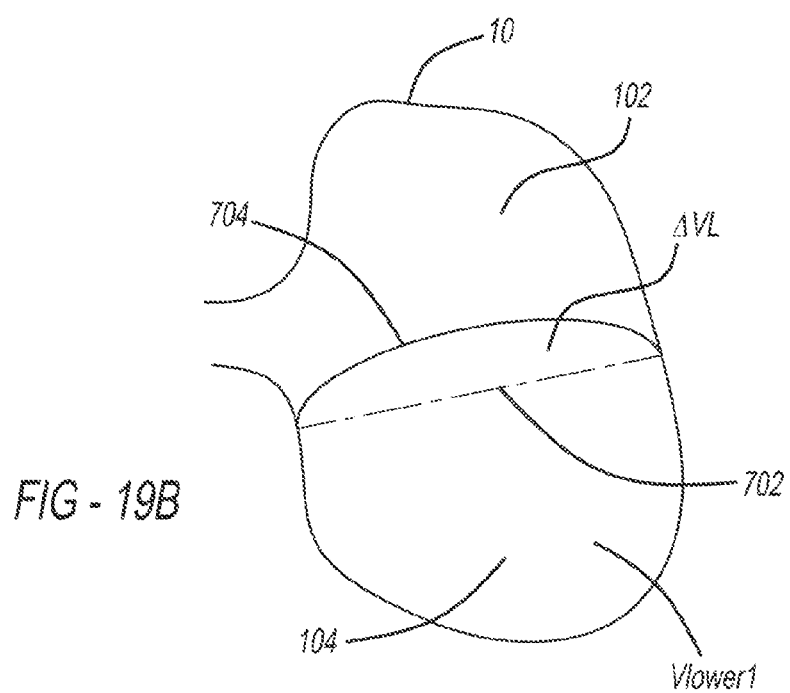

Referring to FIGS. 19A and 19B, in a particular embodiment, it has also been found that the divider 100 can be structured and attached to the front panel 12 and side panels 14 and 16 such that the sum ($V_{upper} + V_{lower}$) of the volumes of the upper and lower chambers 102 and 104 after attachment of the divider and when the airbag is in a fully inflated condition, is greater than the internal volume $V_{overall}$ of the airbag (as defined by only panels 12, 14 and 16) without the divider attached and in a fully inflated condition.

This is due to the upper chamber volume $V_{upper}$ including both a $V_{upper1}$ (as measured when the upper and lower chambers have the same internal pressures, represented as divider configuration 702 in FIG. 19A) and an additional volume $\Delta VU$, which is the difference between $V_{upper1}$ and the expanded upper chamber volume (represented as divider configuration 704 in FIG. 19A) produced when a pressure differential between the chambers causes a net deflection of the divider 100 toward lower chamber 104 (FIG. 19A). The effect described is also due to the lower chamber volume $V_{lower}$ including both a $V_{lower1}$ (as measured when the upper and lower chambers have the same internal pressures, represented as divider configuration 702 in FIG. 19B) and an additional volume $\Delta VL$, which is the difference between $V_{lower1}$ and the expanded lower chamber volume (represented as divider configuration 706 in FIG. 19B) produced when a pressure differential between the chambers causes a net deflection of the divider 100 toward upper chamber 102 (FIG. 19B). Thus, in this embodiment, a sum of the volume $V_{upper}$ of the upper chamber in a fully inflated condition and the volume $V_{lower}$ of the lower chamber in a fully inflated condition is greater than a fully inflated internal volume $V_{overall}$ of the airbag without the divider positioned therein.

It has been found that a ratio $(V_{upper} + V_{lower})/V_{overall}$ having a value of up to 1.2 may be provided by attaching a suitably configured divider to the outer airbag panels. Thus, the sum ($\Delta V_{upper} + \Delta V_{lower}$) may comprise up to 20 percent of $V_{overall}$. In a particular embodiment, $\Delta VL = \Delta VU$.

Figure 15:
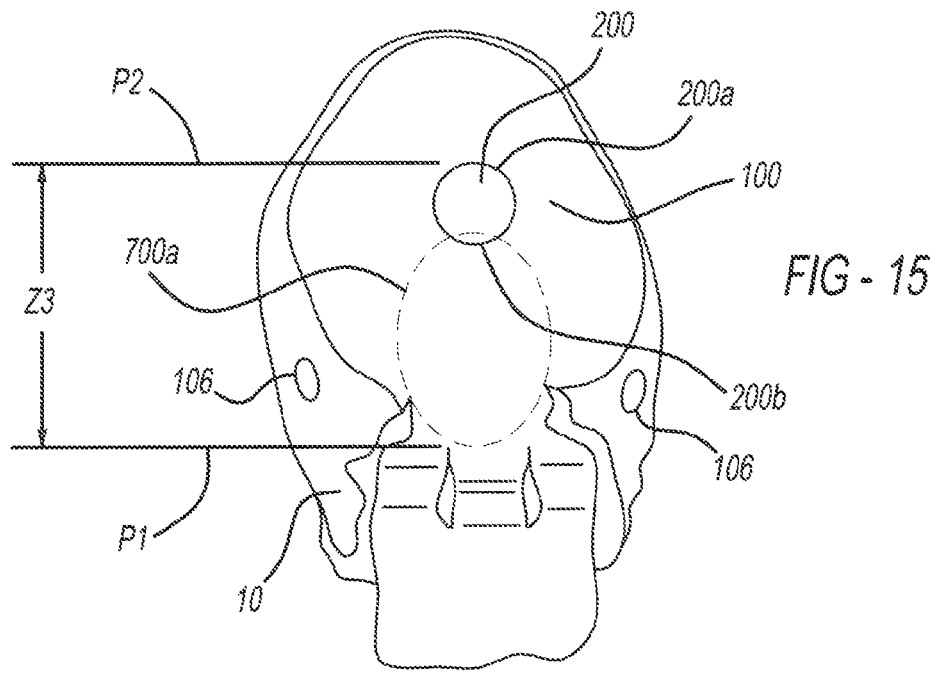
FIG. 15 is a dividing panel in plan view of an uninflated airbag showing a location of a representative inter-chamber vent opening in the divider.
Figure 16:
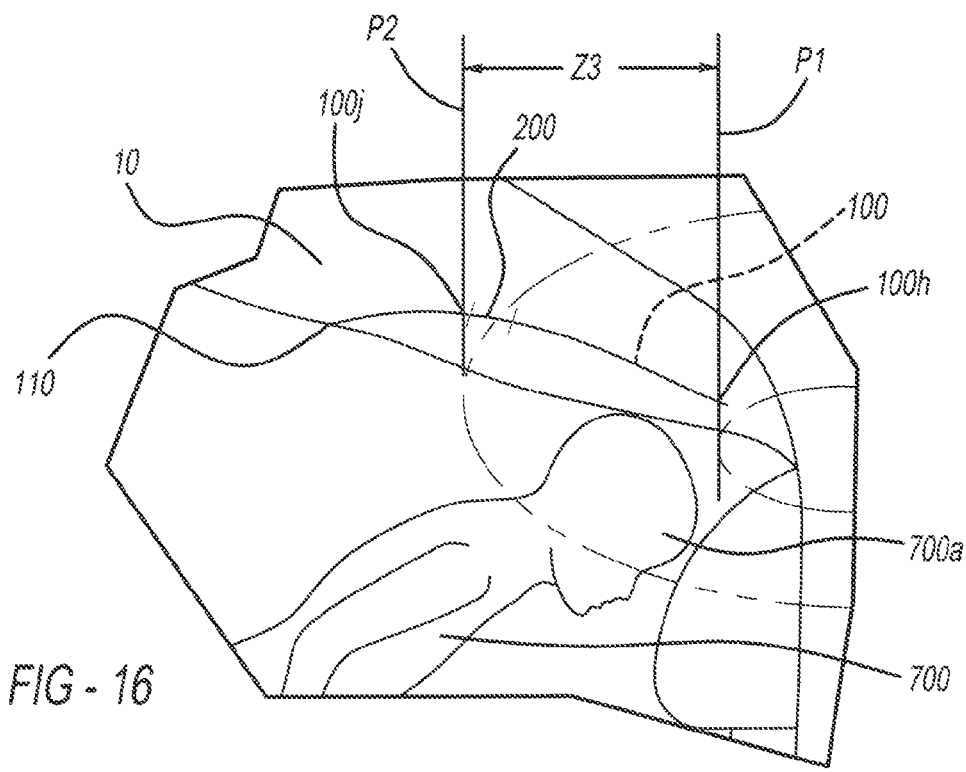
FIG. 16 is a side view of a portion of the airbag shown in FIG. 15 in an inflated state, showing a location of the inter-chamber venting, and showing the initial stage of inflation of one embodiment of the airbag.
Figure 16A:
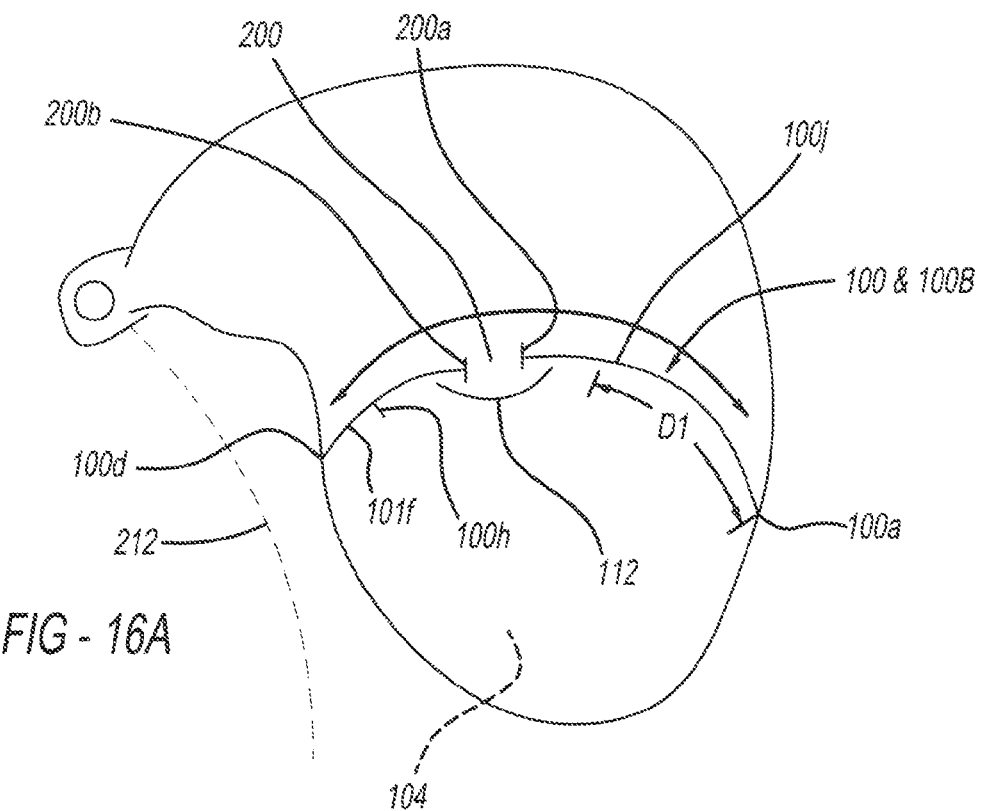
FIG. 16A is cross-sectional side view of the airbag embodiment shown in FIG. 16.

Referring to FIGS. 15-17, in yet another embodiment, a valve mechanism 112 controls and provides a directional gas flow through one or more openings 200 (FIG. 15) formed in divider 100. Opening(s) 200 are provided to enable fluid communication from upper chamber 102 into lower chamber 104. It has been found that airbag performance after activation and during filling is affected by the distance (or distances) 100f of the opening(s) 200 from the inflator side 100d of the airbag (as seen in FIG. 16a), and also by the distance (or distances) of the opening(s) 200 from the front or passenger side 100a of the airbag along an axis extending parallel to the fore-aft axis of the vehicle. More specifically, if leading edge 200a of the openings 200 (or the leading edge of any opening, if multiple openings are used) is located nearer to the occupant contact side of the cushion than a location 100j defined by a distance D1 from the occupant side (as measured from the seam connecting the divider 100 with the front portion of main panel 12 and along a surface of the divider, the airbag will have a tendency to pull excessively downward during inflation of the upper chamber 102, thereby pulling the airbag out of the desired alignment with the passenger's body shown in FIG. 4, prior to contact between the passenger and the inflating airbag.

Also, if a rear-most edge 200b of the opening 200 (or the rearmost edge of any opening, if multiple openings are used) is located closer to the inflator side 100d of the airbag than a location 100h (residing a predetermined distance 100f along the a surface of the divider 100 from the inflator side 100d), the movements of the components of the valve mechanism 112 may be constricted by proximity to the instrument panel profile (as denoted by line 212 in FIG. 16A), thereby impairing valve operation. Thus, between locations 100h and 100j along a surface of the divider is an interval or zone in which the opening or openings 200 should be positioned to achieve adequate gas flow to fill the lower chamber.

While movement of the leading edge(s) 200a past the distance D1 and farther away from the front portion of the main panel 12 eliminates excessive downward pull of the airbag during the initial stages of inflation, thereby improving the overall performance of the bag with respect to an adult occupant, this positioning of the opening(s) may result in less-than-optimum performance for Out of Position-1 children. There is a balance between these requirements which may be tuned for a specific vehicle or specific application in order to achieve the best overall performance both early and later in the deployment event, and for both types of passenger. Between locations 100h and 100a lie an optimal location or locations for tuning the initial cushion fill and cushion pitch to achieve the desired results for a given application. The exact desired location of the opening (or openings) 200 for a particular application may be determined iteratively, by experimentation, or analytically.

In particular embodiments of the airbag, it is desired to position the opening(s) 200 along the divider 100 so that, during inflation, the airbag 10 reacts with a child passenger in a predetermined manner. More specifically, the opening(s) 200 are positioned along the divider such that, as the upper chamber fills in the initial stage of deployment, the bag upper chamber 102 inflates above the top of the head 700a of a Hybrid III 3 and 6-Year Old Anthropomorphic Test Device (ATD) (generally designated 700) when the head is positioned resting against or proximate the vehicle instrument panel at a location specified as Position-2 for NHTSA Out of Position (OOP) testing in accordance with FMVSS Standard No. 208 (which may be found, for example, at http://www.fmcsa.dot.gov/rules-regulations/administration/fmcsr/fmcsrruletext.aspx?reg=571.208), which is incorporated herein by reference in its entirety. The Hybrid III 3 and 6-Year Old test ATD has physical parameters defined by the National Highway Traffic Safety Administration at "http://www.nhtsa.gov/Research/HYBRID+III+6-Year+Old+Physical+Data"\t "_blank", the contents of which is incorporated by reference in its entirety. Position-2 for Out of Position testing is also shown in FIG. 5 of the reference available at "http://www.nhtsa.gov/cars/rules/rulings/80g/80giii.html", the substance of which is repeated in this application as FIG. 18.

As gases flow into the lower chamber 104 from the upper chamber 102, the lower chamber 104 inflates in the later stages of deployment so as to occupy a space behind and around the child's head, thereby preventing and/or mitigating harmful interactions between the airbag and the child's head. This inflation progression is shown in FIGS. 16 and 17.

Figure 20:
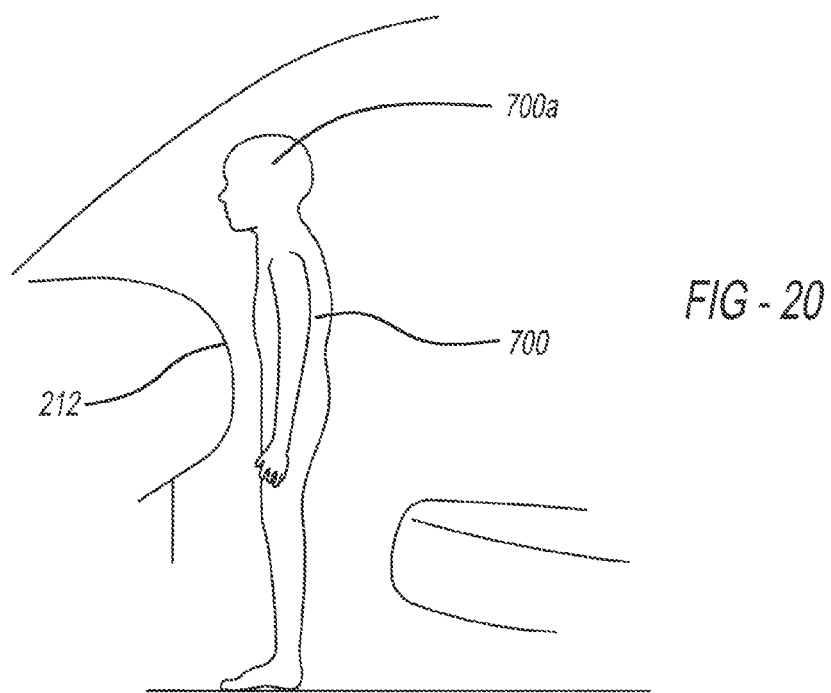
FIG. 20 is a side view of a 3 year-old Anthropomorphic Test Device in positioned in Position-1 for NHTSA Out of Position testing under FMVSS Standard No. 208, prior to activation of a vehicle airbag.
Figure 21:
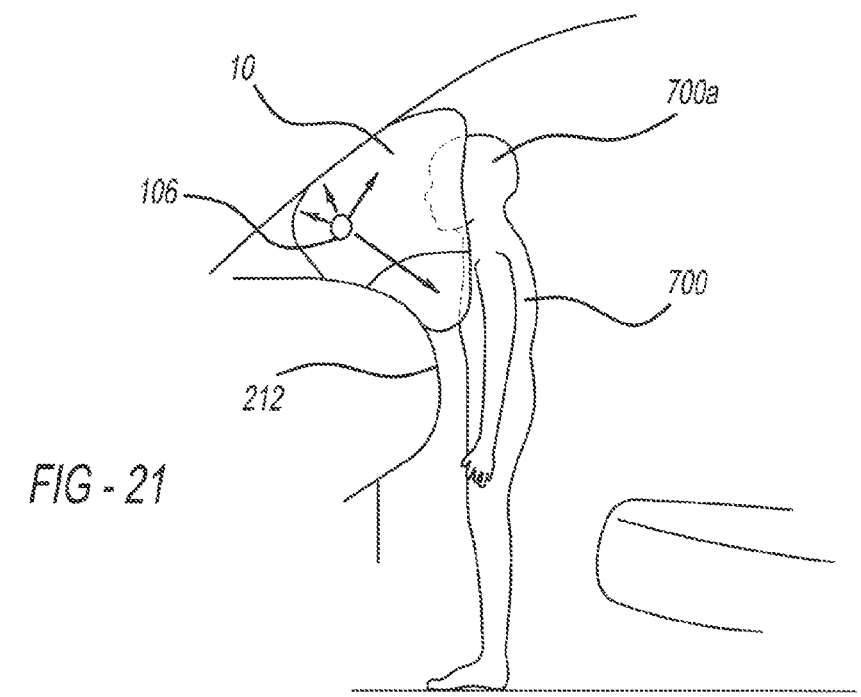
FIG. 21 is the side view of FIG. 20 after activation of a vehicle airbag.

The values of D1, 100f and other valve positioning parameters are determined as a function of the vehicle interior dimensions and the placement of the out-of-position-2 child, according to the previously mention NHTSA standards. Practical limitations of the valve placement affect the airbag performance for an out-of-position 3-year old or 6-year old child, as defined by NHTSA FMVSS Standard No. 208. By positioning the valve 112 within the range defined by locations 100h and 100i (i.e., zone Z3) in FIGS. 16A and 16B, the forces exerted by the airbag on both the 3-year old and 6-year old child in Position-1 (shown in FIG. 20) will be distributed between the child's head and thorax regions. For example, it has been found that when the valve 112 is positioned within a distance D1 along the divider from a seam connecting the divider 100 with the occupant side of the airbag, the airbag will tend to impact the child when deployed, before completely filling. This contact with the child tends to prevent the gases from flowing into the lower chamber, which may produce greater forces acting on the child. Also, it has been found that when the valve 112 is positioned within a predetermined distance 100f along the divider from an inflator side 100d of the airbag toward an occupant side of the airbag, the airbag will tend to impact the child when deployed, before completely filling, with the results previously mentioned. In contrast, referring to FIG. 21, it has been found that when the valve 112 is positioned within zone Z3 as previously described, the gases are permitted to flow into the lower chamber without obstruction. This creates a more evenly distributed loading on the child's head and thoracic regions. Also, with this placement of the valve, the gases can more easily flow out of the vents 106 from the upper chamber.

Figure 16B:
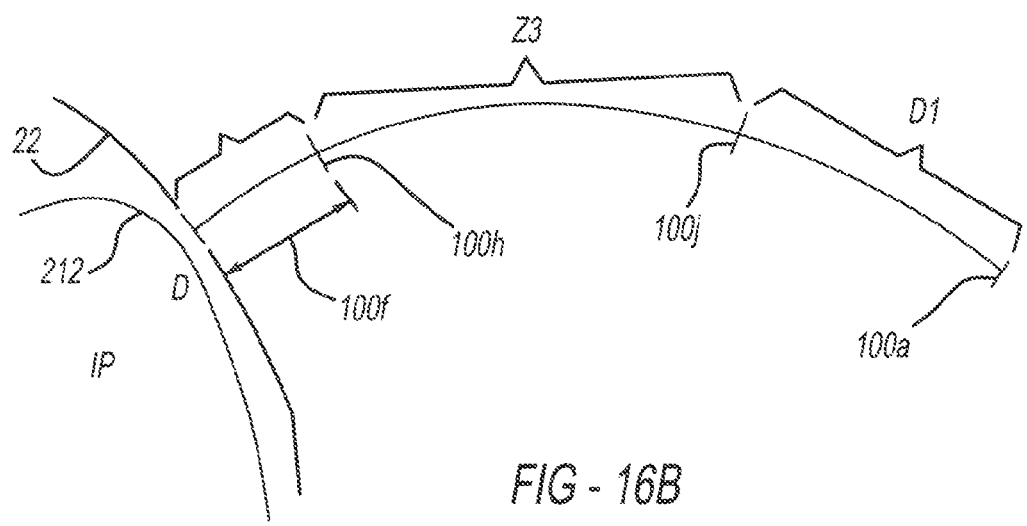
FIG. 16B is a magnified view of a portion of the cross-sectional side view shown in FIG. 16A.

It has been found that an optimum inflation profile range and alignment with the passenger's body as shown in FIG. 4, as well as the bag inflation progression shown in FIGS. 16-17, can be achieved by positioning all divider openings 200 such that all edges of all the openings reside within the zone bounded by or residing between locations 100h and 100j in FIG. 16A, which may also be defined on one side by a vertical plane P1 shown in FIG. 16 corresponding to location 100h in FIG. 16b abutting the front-most portion of the head of the Hybrid III 6-Year Old Anthropomorphic Test Device when the head of the Hybrid III 6-year old is in Position-2 for NHTSA Out of Position testing as specified above, and on an opposite side by a vertical plane P2 (see FIG. 16) passing through location 100j shown in FIG. 16B. As known in the pertinent art, an anthropomorphic test device is a human form in shape, mass and mechanical response, equipped with sensors including accelerometers, deflection sensors and other measurement devices, to simulate the performance of the human body. It is used in the assessment of injury potential in vehicle safety testing. In one embodiment, plane P2 is spaced apart approximately 17.78 cm (7 inches) from plane P1 toward a rear of the vehicle when the airbag is inflated. This effectively positions the divider opening(s) within a zone enclosing the head of the Hybrid III 6-Year Old ATD. The distance between planes P1 and P2 defines a zone Z3 in which the openings 200 may be positioned. For example, FIG. 15 is a plan view of an uninflated airbag showing an embodiment of the airbag divider 100 having a circular opening 200 positioned such that the rear-most edge of the opening resides within the specified zone Z3 when the bag is inflated.

It has also been found that a total area of the opening (or openings) 200 within a range of 700 square millimeters (achievable using, for example, one opening of approximately 15 mm radius) to 32,000 square millimeters (achievable using, for example, one opening of approximately 100 mm radius opening) is desirable for helping to ensure that airbag performance is within an optimum range. In embodiments of the present invention, which use a directional valve mechanism to facilitate inflow and restrict backflow from the lower chamber to the upper chamber as previously described, the areas of the divider opening or openings may need to be at or near an upper end of this range of opening sizes 700 to 32,000 square millimeters, to provide the necessary inflation profile given the reduction in flow caused by turbulence and friction in the gases as they flow through the opening(s) and interact with the portions of the valve.

In one embodiment, the opening or openings 200 are circular. However, the opening(s) can have any desired shape, as long as the total area of the opening(s) is within the range specified above, and as long as all of the opening edges are positioned within the zone defined above.

In addition, the number of openings 200 and the optimum size(s) of the opening(s) formed in divider 100 for a particular application may be determined based on the type of vehicle collision pulse and interior geometry of the vehicle in which the airbag is installed, the desired fill rate of the airbag, the volume ratio, the type of directional valve used, the overall dimensions and curvature of the instrument panel, and other pertinent factors. The size(s) and position(s) of the opening(s) 200 as described herein facilitate smooth and rapid transfer of inflation gases from the upper chamber to the lower chamber during initial stages of airbag filling. Once equilibrium is substantially reached between the upper and lower chamber pressures, flow from one chamber to the other is reduced. As the occupant begins to load the lower chamber of the cushion, the pressure within the lower chamber increases, causing the operating member of the valve to restrict the backflow of gas from the lower chamber to the upper chamber. This restricted flow now is effectively absorbing energy from the occupant interaction with the bag lower chamber. The flow restriction can also be adjusted or tuned in order to absorb the occupant energy as required for a particular application. The directional valve 312 controlling flow between the upper and lower chambers can have a single operating member which provides both a desired inflow (to the lower chamber) and a desired backflow (back from the lower chamber) characteristic, or the valve can have one operating member for controlling inflow and another operating member to control outflow from the lower chamber. In the later phases of the occupant loading of the cushion, backflow from the lower chamber goes into the upper chamber and then the gas is discharged from the upper chamber into the environment through the main vents (not shown) located in the wall of the upper chamber.

In an embodiment where multiple valves are incorporated into or coupled to divider 100 to increase gas flow into lower chamber 104, all of the valves need not be positioned within zone Z3. However, it is desirable to position any additional valves within zone Z3 rather than within the distance D1 from divider leading edge 100a.

In the case of an Out of Position child in accordance with the NHTSA Position-2 testing standard, the initial stages of the cushion deployment development remains the same as described above. However, the gas flow between the upper and lower chambers as regulated by the divider valve mechanism is different when a child interacts with the cushion. In the case of the Out of Position-2 child, the volume of the lower chamber is decreased due to the space occupied by the Out of Position Child. The divider valve mechanism continues to permit the flow of gases from the upper chamber into the lower chamber. However, the valve mechanism also allows the gas to continue to flow into the lower chamber until the cushion's lower chamber and upper chamber internal pressures are in equilibrium, thereby stabilizing the interaction between the cushion and the out of position child. The divider valve mechanism 112 and cushion main vent designs are structured to facilitate rapid transition of this state of equilibrium into an adaptive state, wherein the cushion changes from a state of gas flow into the lower chamber to a state where the gas flow is increased out of the main vents (located in wall(s) of the upper chamber) into the environment. This increased flow out of the cushion allows for decreased pressure within the upper chamber and then allows for the backflow of gases from the lower chamber back into the upper chamber and out of the main vents into the environment. This adaptability of the valve mechanism 112 to regulate the flow communication between the two chambers is important for the protection of adult and child occupants.

In particular embodiments of the present invention described herein, the various airbag elements are shaped and connected to each other so that, when fully inflated, the front side 20 of the bag aids in maintaining alignment of the head, neck, and thoracic body regions along a line L as shown in FIG. 4 during early occupant interaction with the airbag, wherein the upper body portion of the occupant pivots forward from the hip point 202 along line L. As the occupant contacts the bag, it is desirable to maintain the alignment of the head and thorax regions and balance the energy absorption by the bag from the head and the thorax, to minimize the relative motion at the neck. As seen in FIG. 4, the bag is structured such that the portions of the upper and lower chambers of the cushion facing the occupant 20 form an essentially flat plane, indicated by the line P in the drawing. At the early stages of airbag inflation, the occupant seatbelt (not shown) tensions to restrain the occupant's lower thoracic region in the seat. Thus, the hip point 202 resides at a first location H1. At a later stage of inflation, as the seatbelt tensioner relaxes, thereby permitting the hip point 202 to shift from location H1 to a second location H2, closer to or lying on plane P. Thus, during the later stages of inflation, due to movement of the occupant, the line L approaches or lies along plane P.

It has been found that passenger-side airbags structured as described above are especially effective in providing optimal cushion performance for various sizes of adults and also for achieving low risk deployment performance specifications for 3 & 6 year old ATDs, as specified in the safety regulations previously mentioned. The proportioning of the pressures in the upper and lower chambers as previously described, in conjunction with the bag structure previously described, enable the airbag chamber surfaces to absorb energy responsive to interaction with both the heavier thorax and the smaller and lighter head region, so as to help maintain body alignment along line L (FIG. 4) during contact between the passenger and the airbag. Particularly from the perspective of the adult $5^{th}$ female and adult $50^{th}$ male, optimum airbag performance is provided by maintaining, to the greatest degree possible, both of these body regions in line with respect to one another, while enabling the upper body as a whole to pivot at the hip axis.

Figure 23A:
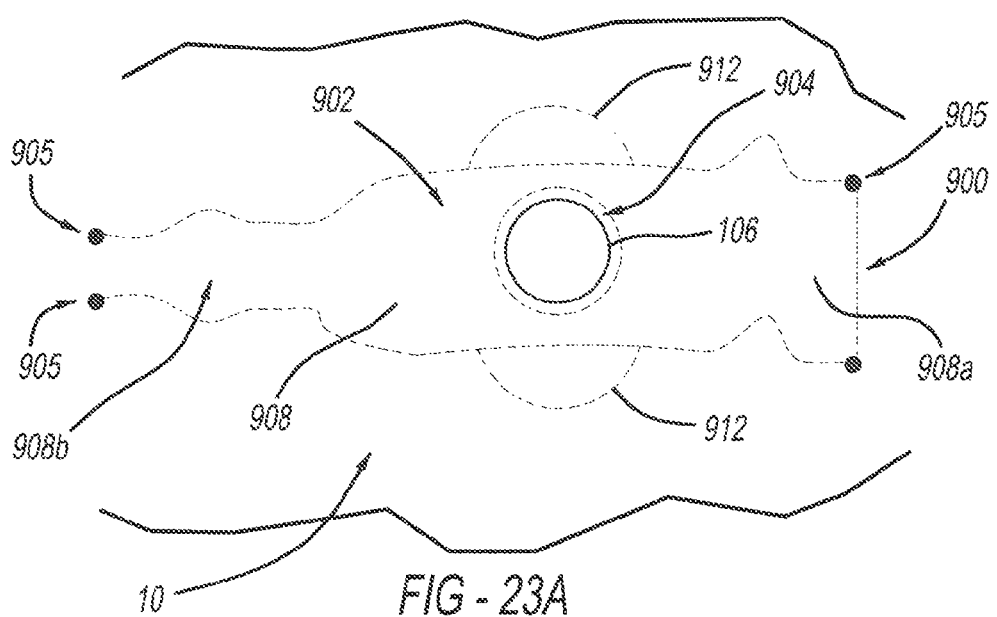
FIG. 23A is a view of one embodiment of a second valve assembly providing a fluid communication between the exterior and interior of the airbag, prior to actuation of the airbag.
Figure 23B:
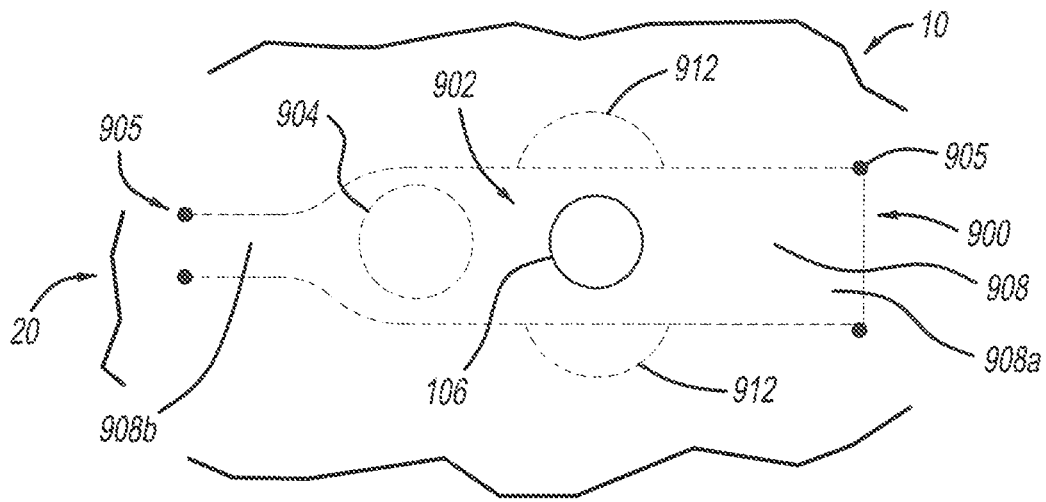
FIG. 23B is a view of the second valve assembly in FIG. 23A, after actuation of the airbag.

In contrast to the embodiments having a valve assembly 112 only in the divider 100, the multi-valve assembly as described above is further exemplified by the embodiments shown in FIGS. 23A and 23B.

FIG. 23A exemplifies a pre-actuated airbag 10 containing a multi-valve assembly configuration wherein a first valve assembly (not shown) is located in the divider and a second valve assembly 900 is fixed to a first chamber 102 (or upper chamber 102 in this instance). One or more gas exit orifices 106 are located in an upper panel 12 of the airbag 10. A tether 908 is sewn to an interior 11 of the airbag 10 at a plurality of attachment points or seams 905. A first portion 908a of the tether 908 extends between the rear or inflator side 22 and the orifice 106. A second portion 908b of the tether 908 extends between the orifice 106 and the front side 20 of the airbag 10. As shown in FIG. 23A, each of portions 908a and 908b are somewhat folded over to provide slack in the tether 908 prior to actuation of the airbag 10. One or more tether orifices 904 are formed within the tether 908. As shown in FIG. 23A, prior to actuation of the airbag 10, the tether orifice(s) 904 is initially aligned with airbag orifice 106 to permit venting of the first or upper chamber 102. A guide member or sleeve 912 is sewn to the interior wall 11 such that the tether 908 extends through the guide member 912, thereby ensuring that the tether 908 remains proximate to the orifice 106 during airbag inflation.

FIG. 23B exemplifies the airbag of FIG. 23A, but in a post-actuated position. As pressure increases within the first chamber 102, the tether 908 is drawn toward the front face 20 as the tether 908 slidably engages the guide member 912. By virtue of the attachment points or seams 905, the tether 908 is constrained to tighten as the airbag fills, thereby effectively moving the orifice(s) 904 from its original position shown in FIG. 23A, to a non-aligned position, relative to orifice 106. Accordingly, the non-perforated tether portion 908a is therefore biased in a flush relationship to orifice 106, thereby closing the valve assembly 900 and affecting a relatively quicker increase in pressure in chamber 102.

Figure 24A:
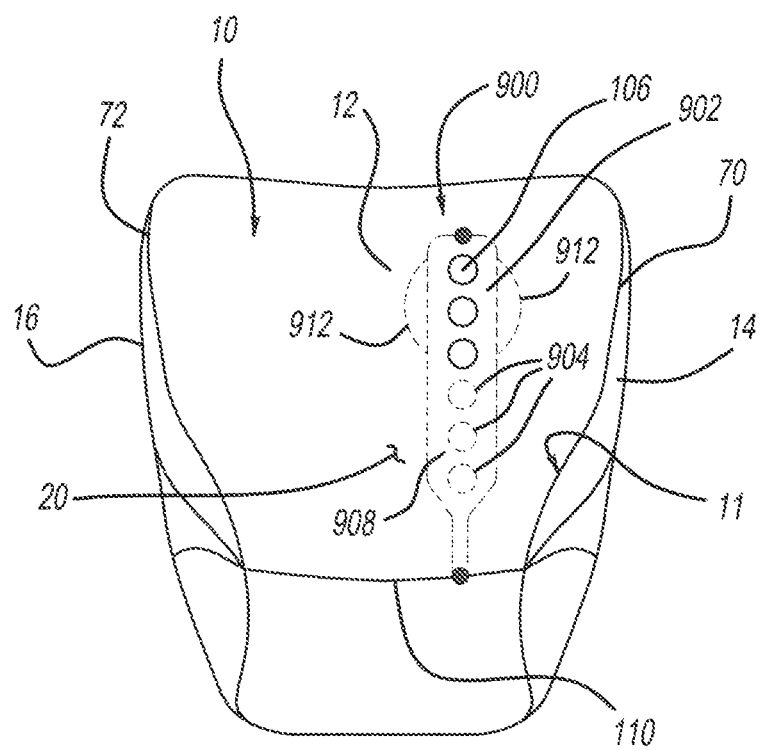
FIG. 24A is a top view of an airbag containing a second valve assembly enabling a fluid communication between the exterior and interior of the airbag, wherein the second valve assembly is shown in the closed position.

FIG. 24A exemplifies an actuated airbag incorporating a second valve assembly 900. As shown in FIG. 24A, upon actuation of the airbag and increased pressure within the first or upper chamber 102, the tether gas exit orifices 904 are "pulled" out of alignment (as shown in FIG. 23 for example) with airbag gas exit orifices 106. Other reference numbers refer to the same constituents as detailed in FIGS. 23A and 23B.

FIG. 24B exemplifies a similar embodiment of the multi- or dual-valve assembly configuration of FIGS. 23A and 23B, prior to actuation of the airbag 10. FIG. 24A illustrates the implementation of the valve assembly 900 within the airbag of FIG. 2, where the valve or first valve assembly 112 is also shown formed within the divider 100. As with FIG. 23A, the orifice 106 is aligned and in fluid communication with the gas exit orifices 904 of the tether 908.

FIG. 24C exemplifies a post-actuated condition of the airbag of FIG. 24A, illustrating the first valve assembly 112 within the divider 100. Further, the second valve assembly 900 is again shown within the first or upper chamber 102 guided by sleeve 912. Upon actuation of the airbag 10 the airbag orifice 106 and the tether orifice(s) 904 are effectively misaligned to close the valve 900 as portion 908a is at least partially sealed against orifice 106 in a flush relationship.

FIG. 24D is a cross-section of the tether 908 as it extends through the sleeve 912.

FIG. 25A is another embodiment of the multi- or dual-valve assembly airbag configuration in accordance with the present invention. FIG. 25A exemplifies a pre-actuated airbag 10 containing a multi-valve assembly configuration wherein a first valve assembly (not shown) is located in the divider and a second valve assembly 900 is fixed to a first chamber 102 (or upper chamber 102 in this instance). One or more gas exit orifices 106 are located in an upper panel 12 of the airbag 10. A tether 908 is sewn to the airbag 10 at a plurality of attachment points or seams 905. A first portion 908c of the tether 908 extends between the rear or inflator side 22 and the orifice 106, and is sewn to the exterior wall 15 of the airbag 10. A second portion 908d of the tether 908 extends between the orifice 106 and the front side 20 of the airbag 10, and is sewn to an interior wall 11 of the airbag 10. A slot 917 is formed in the panel 12 of the airbag 10, and provides a path for the tether 908 as it passes from the exterior of the airbag 10 to the interior chamber 102 of the airbag 10. The slot 917 substantially performs the same guide function as the sleeve 912 in the embodiment of FIG. 23A. As shown in FIG. 25A, each of portions 908c and 908d are somewhat folded over to provide slack in the tether 908 prior to actuation of the airbag 10. One or more tether orifices 904 are formed within the tether 908. As also shown in FIG. 25A, prior to actuation of the airbag 10, the tether orifice(s) 904 is initially aligned with airbag orifice 106 to permit venting of the first or upper chamber 102.

FIG. 25B exemplifies the airbag of FIG. 25A, but in a post-actuated position. As pressure increases within the first chamber 102, the tether 908 is drawn toward the front face 20 as the tether 908 slidably engages the guide member 917 and passes therethrough. By virtue of the attachment points or seams 905, the tether 908 is constrained to tighten as the airbag fills, thereby effectively moving the orifice(s) 904 from its original position shown in FIG. 25A, to a non-aligned position, relative to orifice 106. Accordingly, the non-perforated tether portion 908c is therefore biased in a flush relationship to orifice 106, thereby closing the valve assembly 900 and affecting a relatively quicker increase in pressure in chamber 102.

Figure 26A:
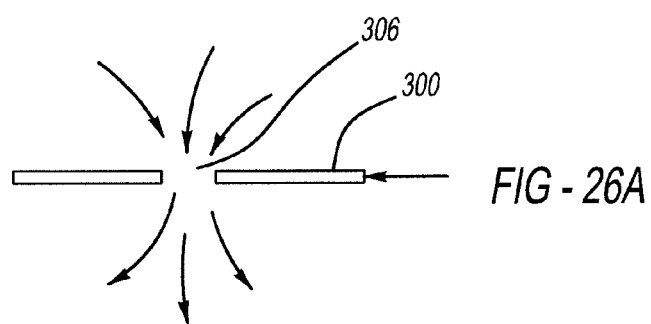
FIGS. 26a and 26b illustrate a divider in accordance with the present invention.
Figure 26B:
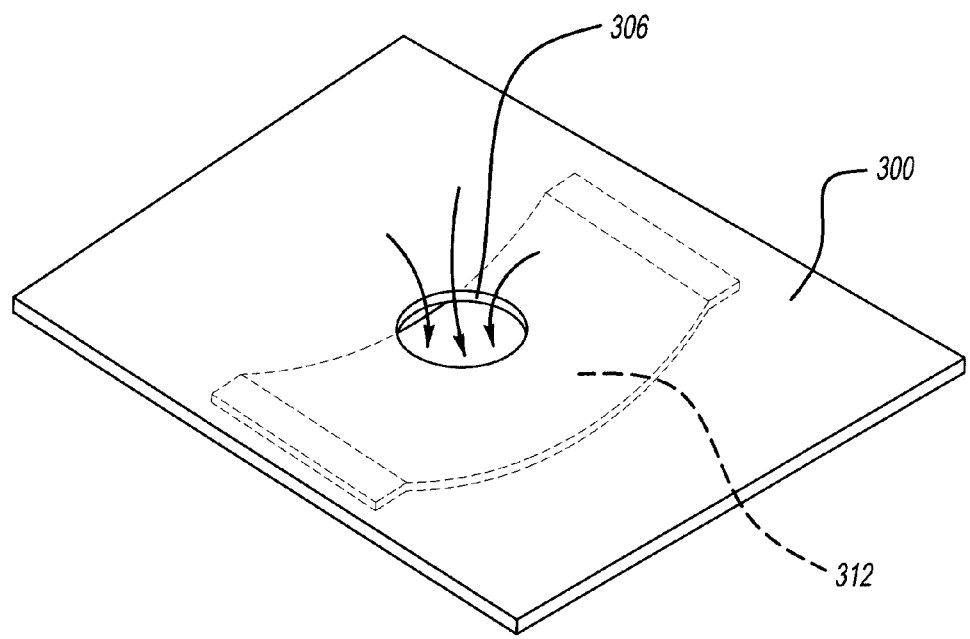
Figure 27:
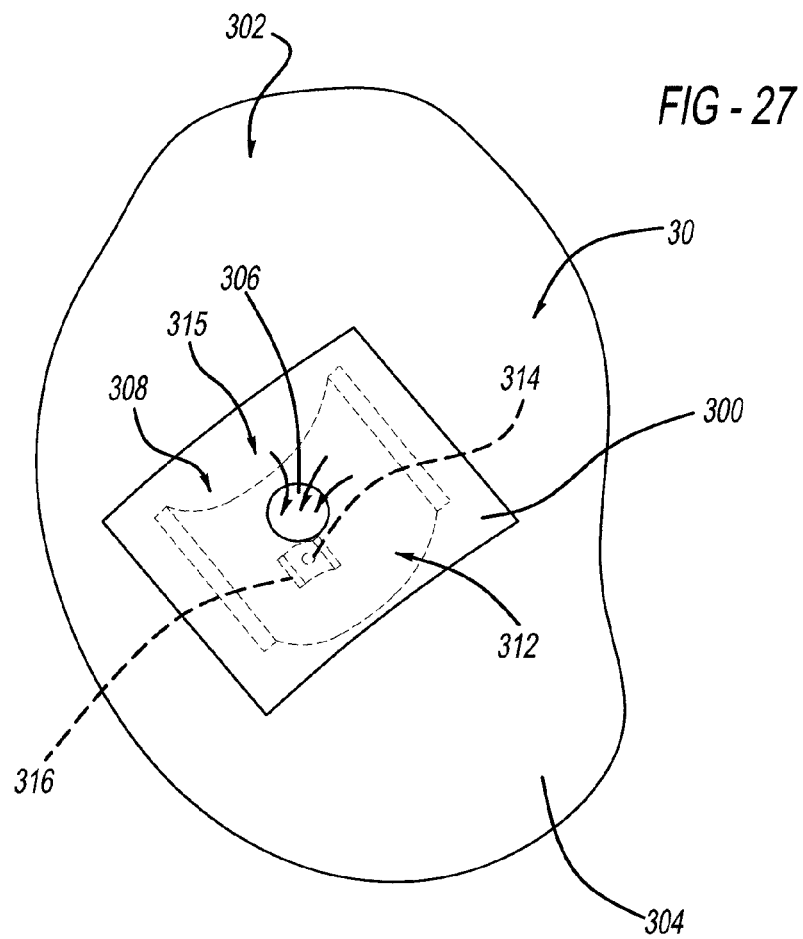
FIG. 27 illustrates a divider and a valve in accordance with the present invention.
Figure 28A:
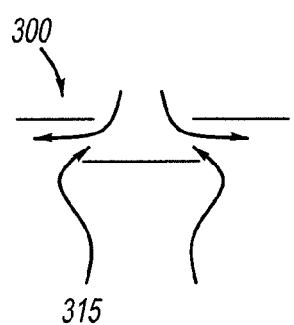
FIGS. 28a and 28b illustrate a valve of the divider in accordance with the present invention.
Figure 28B:
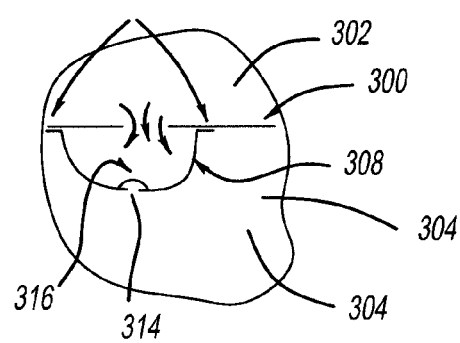

In yet another embodiment, it may be desirable to modulate the airbag chamber pressure from the upper chamber to the lower chamber, and then, from the lower chamber to the upper chamber. Accordingly, in contrast to the embodiments described above, an embodiment shown in FIGS. 26 and 27 illustrates a divider and valve that facilitates the flow of gas from the upper chamber to the lower chamber, and then, from the lower chamber back to the upper chamber. Accordingly, an object of the embodiment of FIGS. 26-29, but not by way of limitation, is to provide a predetermined equilibrium between the designed pressure over time existing within the upper and lower chambers, respectively.

As shown in FIGS. 26-29, a fabric two-way valve 312 is sewn or otherwise attached to a divider panel 300 (constructed as described above) and connects the upper and lower chambers to facilitate fluid communication between the upper chamber 302 and the lower chamber 304. A main orifice 306 is formed within the dividing panel 300 and facilitates the initial flow of inflator gas from the upper chamber 302 to the lower chamber 304. A first valve cover 308 is preferably formed from the same fabric as the divider 300, whereby the first valve cover 308 is attached to the underside of divider panel 300 at first divider attachment points 310, to at least partially cover the main orifice 306. First gas pathways 315 are defined by the resultant interface defined between the first valve cover 308 and the divider panel 300, whereby initial gas flow from the upper chamber 302 is diverted or channeled through the first gas pathways 312a about the first valve cover 308 and into the lower chamber 304.

A second orifice 314 is formed in the first valve cover 308 thereby providing fluid communication from the lower chamber 304 back into the upper chamber 302 subsequent to the initial transfer of gas from the upper chamber to the lower chamber. A second valve cover 316 is sewn or otherwise attached to the first valve cover 308 at second attachment points 318, to at least partially cover the second orifice 314. Second gas pathways 320 are defined by the resultant interface defined between the second valve cover 316 and the first valve cover 308, whereby secondary gas flow from the lower chamber 304 is channeled through the second gas pathways 320 through the main orifice 306 and back into upper chamber 302.

Figure 29A:
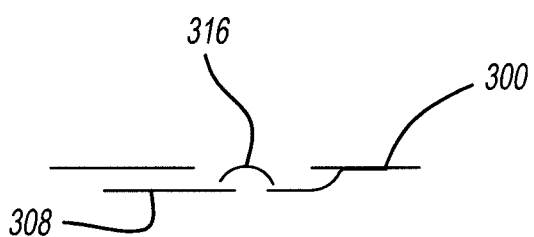
FIGS. 29a illustrates a sealed state of the first valve assembly, in accordance with the present invention.
Figure 29B:
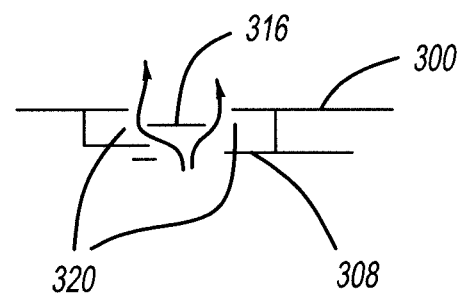
FIGS. 29*b* illustrates an unsealed state of the first valve assembly, in accordance with the present invention.

In operation, an associated inflator (not shown in FIGS. 26-29, but exemplified in the other embodiments and in the prior art) is actuated upon a crash or collision event. Inflation gas initially fills the upper chamber 302 and then flows through the main orifice 306 and through first gas pathways 315, and then into lower chamber 304. As pressure increases within the lower chamber 304, the first valve cover 308 is responsively designed to cover the main orifice 306 thereby attenuating the backflow from the lower chamber 304 back into the upper chamber 302, and simultaneously and substantially occluding the gas flow through first gas pathways 315. However, once the occupant (not shown) makes physical contact with the airbag 30, the outer pressure from the occupant increases the gas pressure within the lower chamber 304. The increased pressure within lower chamber 304 exerts or biases a force on the second valve cover 316 that "lifts" the second valve cover 316 from the normally closed and flush position over the second orifice 314. As the second valve cover 316 is "lifted" as shown in FIG. 29, a secondary gas flow is facilitated through second gas pathways 320 and then upward and into first chamber 302.

It has also been found that airbags incorporating interior volume ratios as defined herein and including divider panel leading edges positioned as defined herein provide improved vehicle occupant protection for a wide range of passenger sizes, especially for children and out-of-position occupants.

In sum, the invention may be characterized as:

an airbag comprising a first chamber and a second chamber; a perforated dividing panel attached to an inner wall of the airbag thereby providing said first chamber and said second chamber, said perforated dividing panel containing at least one main orifice; a valve for one-way or two-way fluid communication between said first chamber and said second chamber, the valve providing fluid communication through said at least one main orifice; a first valve cover attached to said dividing panel for covering said at least one main orifice, said first valve cover facilitating fluid flow from said upper chamber to said lower chamber and attenuating fluid flow from said lower chamber into said upper chamber; at least one optional second orifice formed in said first valve cover, said second orifice selectively sealed during actuation of said airbag; and an optional second valve cover attached to said first valve cover for covering said at least one optional second orifice, said optional second valve cover facilitating fluid flow from said lower chamber into said upper chamber.

Figure 22:
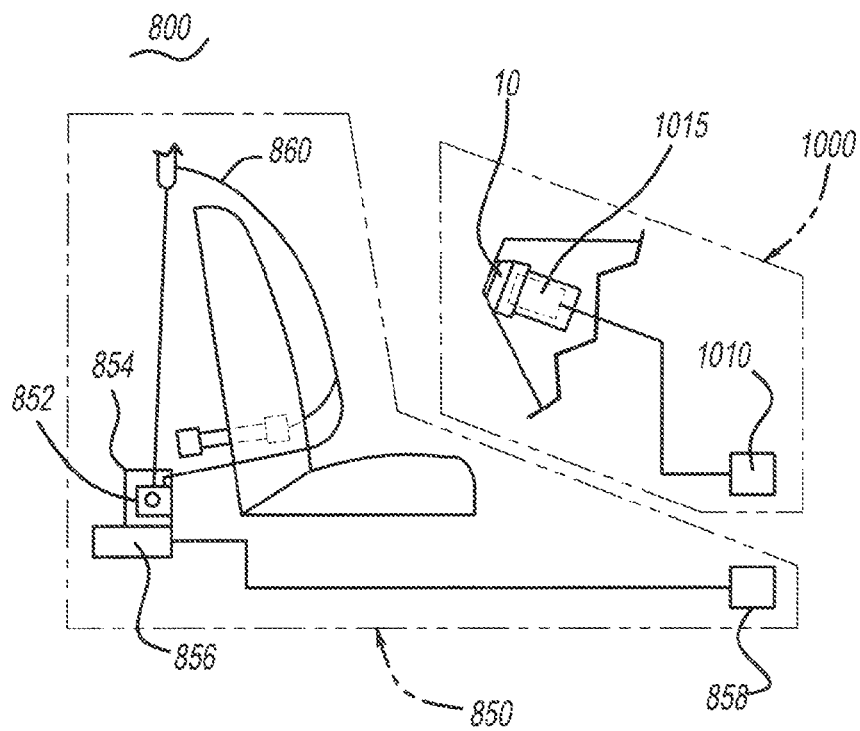
FIG. 22 is a view of a vehicle occupant protection system incorporating an airbag in accordance with an embodiment of the present invention.

Referring now to FIG. 22, an embodiment 10 of the airbag described herein may be incorporated into an airbag system 1000. Airbag system 1000 includes at least one gas source 1015 (for example, a known inflator or gas generating system) and airbag 10 in accordance with an embodiment described herein. The airbag is operatively coupled to the gas source so as to enable fluid communication therewith upon activation of the gas generating system. Airbag system 1000 may also include (or be in communication with) a collision event sensor 1010. Collision event sensor 1010 includes a known collision sensor algorithm that prompts actuation of airbag system 1000 via, for example, activation of gas source 1015 in the event of a collision.

Referring again to FIG. 22, airbag system 1000 may also be incorporated into a broader, more comprehensive vehicle occupant protection system 800 including additional elements such as a safety belt assembly 850. FIG. 22 shows a schematic diagram of one exemplary embodiment of such a protection system. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a known safety belt pretensioner 856 may be coupled to belt retractor mechanism 854 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 850 may also include (or be in communication with) a collision event sensor 858 (for example, an inertia sensor or an accelerometer) including a known collision sensor algorithm that prompts actuation of belt pretensioner 856 via, for example, activation of a pyrotechnic igniter (not shown) incorporated into the pretensioner. U.S. Pat. Nos. 6,505,790 and 6,419.177, previously incorporated herein by reference, provide illustrative examples of pretensioners actuated in such a manner.

As utilized herein, the terms "approximately." "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below." etc., are merely used to describe the orientation of various elements in the FIGURES. It should be noted that the orientation of various elements may differ according to other exemplary embodiments, and that such variations are intended to be encompassed by the present disclosure.

In sum, a preferred embodiment exemplifies an airbag including at least one panel defining an interior of the airbag, and a divider positioned in the interior so as to divide the interior into a first chamber and a second chamber. A first valve assembly is operatively coupled to the divider for controlling the gas flow between the first chamber and the second chamber. A second valve assembly is fixed within the first chamber and fluidly communicates with an exterior of the airbag. The second valve assembly is operably dependent on the first valve assembly, thereby dynamically controlling the inflation profile of the airbag. Stated another way, the dual valve assembly configuration accommodates a variety of occupant kinematics as the airbag is able to respond to a number of occupant interfaces with various portions of the airbag, all while employing a single stage inflator in lieu of a dual stage inflator.

It is important to note that the construction and arrangement of the airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag comprising:
   at least one panel defining an interior of the airbag, said panel containing one or more venting orifices, and
   a divider positioned in the interior so as to divide the interior into an upper chamber and a lower chamber;
   a first valve mechanism operatively coupled to the divider for restricting, but also permitting, a flow of gases from the lower chamber into the upper chamber, the first valve mechanism being structured such that an actuation response time of the valve mechanism in attenuating or impeding gas flow from the lower chamber into the upper chamber is proportional to any pressure increase of the lower chamber relative to the pressure in the upper chamber; and
   a second valve assembly operably configured to the upper chamber, said second valve assembly configured to attenuate or occlude fluid flow through said one or more venting orifices upon substantial pressurization of the upper chamber.

2. The airbag of claim 1 wherein said second valve assembly comprises a tether containing at least one tether orifice, said at least one tether orifice aligned with said one or more venting orifices.

3. The airbag of claim 2 wherein said tether contains an extended portion whereby upon inflation of the upper chamber said extended portion is extended to misalign said at least one tether orifice and said one or more venting orifices.

4. The airbag of claim 3 further comprising a guide member fixed within said upper chamber and about said tether.

5. The airbag of claim 1 wherein said second valve assembly comprises:
   a tether attached to the interior of the airbag;
   a tether orifice formed within said tether; and
   a guide member attached to the interior of the airbag such that said tether extends therethrough, said tether orifice alignable with said one or more venting orifices.

6. The airbag of claim 1 wherein said second valve assembly comprises:
   a tether containing a first portion and a second portion, said first portion attached to an exterior of the airbag and said second portion attached to an interior of the airbag;
   a tether orifice formed within said tether; and
   a slot formed within the airbag such that said tether extends therethrough from the exterior to the interior of the airbag, said tether orifice alignable with said one or more venting orifices.

7. A vehicle including an airbag in accordance with claim 1.

8. A vehicle occupant protection system including an airbag in accordance with claim 1.

9. An airbag comprising:
   at least one panel defining an interior of the airbag, said panel containing one or more venting orifices, and
   a divider positioned in the interior so as to divide the interior into an upper chamber and a lower chamber;
   a first valve assembly operatively coupled to the divider for restricting but not preventing a flow of gases from the lower chamber into the upper chamber upon an increase in pressure in said lower chamber; and
   a second valve assembly fixed within the upper chamber, said second valve assembly configured to attenuate or occlude fluid flow through said venting orifices upon substantial pressurization of the upper chamber.

10. The airbag of claim 9 wherein said second valve assembly comprises a tether containing at least one tether orifice, said at least one tether orifice alignable with said one or more venting orifices.

11. The airbag of claim 10 wherein said tether contains an extended portion whereby upon inflation of the upper chamber said extended portion is extended to misalign said at least one tether orifice and said one or more venting orifices.

12. The airbag of claim 10 further comprising a guide member fixed within said upper chamber and about said tether.

13. The airbag of claim 10 further comprising a slot formed within said airbag, wherein said tether passes from an exterior of the airbag through said slot and into an interior of the airbag.

14. The airbag of claim 10 wherein said at least one tether orifice is aligned with said one or more venting orifices.

15. The airbag of claim 10 wherein said at least one tether orifice is nonaligned with said one or more venting orifices.

16. A vehicle containing the airbag of claim 9.

17. A vehicle occupant protection system containing the airbag of claim 9.

18. An airbag comprising:
   at least one panel defining an interior of the airbag and an exterior of the airbag;
   a divider positioned in the interior so as to divide the interior into a first chamber and a second chamber;
   a first valve assembly operatively coupled to the divider for controlling a flow of gases between the second chamber and the first chamber, said first valve assembly permitting flow from the first chamber to the second chamber when said first chamber exceeds the pressure of said second chamber, and, from the second chamber to the first chamber when said second chamber exceeds the pressure of said first chamber; and
   a second valve assembly fixed within the first chamber, said second valve assembly operably dependent on said first valve assembly, and configured to control fluid flow from said interior to said exterior of said airbag.

19. The airbag of claim 18 wherein said second valve assembly comprises:
   one or more venting orifices in said at least one panel; and
   a tether containing at least one tether orifice, said at least one tether orifice alignable with said one or more venting orifices.

20. A vehicle occupant protection system containing the airbag of claim 18.

21. An airbag comprising:
a first chamber and a second chamber;
a perforated dividing panel attached to an inner wall of the airbag thereby providing said first chamber and said second chamber, said perforated dividing panel containing at least one main orifice;
a valve for one-way or two-way fluid communication between said first chamber and said second chamber, the valve providing fluid communication through said at least one main orifice;
a first valve cover attached to said dividing panel for covering said at least one main orifice, said first valve cover facilitating fluid flow from said upper chamber to said lower chamber and attenuating fluid flow from said lower chamber into said upper chamber;
at least one second orifice formed in said first valve cover, said second orifice selectively sealed during actuation of said airbag; and
a second valve cover attached to said first valve cover for covering said at least one second orifice, said second valve cover facilitating fluid flow from said lower chamber into said upper chamber.

22. An airbag comprising:
at least one panel defining an interior of the airbag, said panel containing one or more venting orifices, and
a divider positioned in the interior so as to divide the interior into an upper chamber and a lower chamber;
a first valve mechanism operatively coupled to the divider for restricting a flow of gases from the lower chamber into the upper chamber, the first valve mechanism being structured such that an actuation response time of the valve mechanism in attenuating or impeding gas flow from the lower chamber into the upper chamber is proportional to any pressure increase of the lower chamber relative to the pressure in the upper chamber; and
a second valve assembly operably configured to the upper chamber, said second valve assembly configured to attenuate or occlude fluid flow through said one or more venting orifices upon substantial pressurization of the upper chamber,
wherein said second valve assembly comprises—
a tether containing a first portion and a second portion, said first portion attached to an exterior of the airbag and said second portion attached to an interior of the airbag;
a tether orifice formed within said tether; and
a slot formed within the airbag such that said tether extends therethrough from the exterior to the interior of the airbag, said tether orifice alignable with said one or more venting orifices.

23. An airbag comprising:
at least one panel defining an interior of the airbag, said panel containing one or more venting orifices, and
a divider positioned in the interior so as to divide the interior into an upper chamber and a lower chamber;
a first valve assembly operatively coupled to the divider for restricting a flow of gases from the lower chamber into the upper chamber upon an increase in pressure in said lower chamber;
a second valve assembly fixed within the upper chamber, said second valve assembly configured to attenuate or occlude fluid flow through said venting orifices upon substantial pressurization of the upper chamber; and
comprising a slot formed within said airbag, wherein said tether passes from an exterior of the airbag through said slot and into an interior of the airbag,
wherein said second valve assembly comprises a tether containing at least one tether orifice, said at least one tether orifice alignable with said one or more venting orifices.

* * * * *